US010544041B2

United States Patent
Oguni et al.

(10) Patent No.: US 10,544,041 B2
(45) Date of Patent: Jan. 28, 2020

(54) METHOD FOR MANUFACTURING GRAPHENE-COATED OBJECT, NEGATIVE ELECTRODE OF SECONDARY BATTERY INCLUDING GRAPHENE-COATED OBJECT, AND SECONDARY BATTERY INCLUDING THE NEGATIVE ELECTRODE

(71) Applicant: SEMICONDUCTOR ENERGY LABORATORY CO., LTD., Atsugi-shi, Kanagawa-ken (JP)

(72) Inventors: Teppei Oguni, Kanagawa (JP); Takeshi Osada, Kanagawa (JP); Toshihiko Takeuchi, Kanagawa (JP)

(73) Assignee: Semiconductor Energy Laboratory Co., Ltd., Kanagawa-ken (JP)

(*) Notice: Subject to any disclaimer, the term of this patent is extended or adjusted under 35 U.S.C. 154(b) by 0 days.

(21) Appl. No.: 15/810,953

(22) Filed: Nov. 13, 2017

(65) Prior Publication Data
US 2018/0065848 A1 Mar. 8, 2018

Related U.S. Application Data

(62) Division of application No. 13/586,126, filed on Aug. 15, 2012, now Pat. No. 9,815,691.

(30) Foreign Application Priority Data

Aug. 19, 2011 (JP) .................................. 2011-179916
Aug. 19, 2011 (JP) .................................. 2011-179957

(51) Int. Cl.
*B82Y 30/00* (2011.01)
*C25D 13/22* (2006.01)
(Continued)

(52) U.S. Cl.
CPC .............. *B82Y 30/00* (2013.01); *C25D 13/02* (2013.01); *C25D 13/22* (2013.01);
(Continued)

(58) Field of Classification Search
CPC ........ B82Y 30/00; C25D 13/02; C25D 13/22; H01M 10/0525; H01M 2004/027;
(Continued)

(56) References Cited

U.S. PATENT DOCUMENTS 4,628,015 A 12/1986 Yata et al.
6,383,686 B1 5/2002 Umeno et al.
(Continued)

FOREIGN PATENT DOCUMENTS

AU 2010200959 9/2010
CN 101233629 A 7/2008
(Continued)

OTHER PUBLICATIONS

Ueno.K, "2.1 Single-Layer Separation by Formation of Graphite Oxide/Chapter 13 Chemical Production Method of Graphene and Application to Organic Semiconductor Element Electrbde", Graphene: Functions and Applications, Jul. 31, 2009, pp. 171-172, CMC Publishing Co., Ltd.
(Continued)

*Primary Examiner* — Lingwen R Zeng
(74) *Attorney, Agent, or Firm* — Nixon Peabody LLP; Jeffrey L. Costellia

(57) ABSTRACT

To form graphene to a practically even thickness on an object having an uneven surface or a complex surface, in particular, an object having a surface with a three-dimensional structure due to complex unevenness, or an object having a curved surface. The object and an electrode are immersed in a graphene oxide solution, and voltage is applied between the object and the electrode. At this time,
(Continued)

the object serves as an anode. Graphene oxide is attracted to the anode because of being negatively charged, and deposited on the surface of the object to have a practically even thickness. A portion where graphene oxide is deposited is unlikely coated with another graphene oxide. Thus, deposited graphene oxide is reduced to graphene, whereby graphene can be formed to have a practically even thickness on an object having surface with complex unevenness.

19 Claims, 20 Drawing Sheets

(51) Int. Cl.
| | |
|---|---|
| H01M 4/04 | (2006.01) |
| H01M 4/13 | (2010.01) |
| H01M 4/133 | (2010.01) |
| H01M 4/134 | (2010.01) |
| H01M 4/139 | (2010.01) |
| H01M 4/1393 | (2010.01) |
| H01M 4/1395 | (2010.01) |
| H01M 4/36 | (2006.01) |
| H01M 4/587 | (2010.01) |
| H01M 10/0525 | (2010.01) |
| C25D 13/02 | (2006.01) |
| H01M 4/02 | (2006.01) |

(52) U.S. Cl.
CPC ....... *H01M 4/0416* (2013.01); *H01M 4/0452* (2013.01); *H01M 4/13* (2013.01); *H01M 4/133* (2013.01); *H01M 4/134* (2013.01); *H01M 4/139* (2013.01); *H01M 4/1393* (2013.01); *H01M 4/1395* (2013.01); *H01M 4/366* (2013.01); *H01M 4/587* (2013.01); *H01M 10/0525* (2013.01); *H01M 2004/027* (2013.01)

(58) Field of Classification Search
CPC .... H01M 4/0416; H01M 4/0452; H01M 4/13; H01M 4/133; H01M 4/134; H01M 4/139; H01M 4/1393; H01M 4/1395; H01M 4/366; H01M 4/587
See application file for complete search history.

(56) References Cited

U.S. PATENT DOCUMENTS

| | | | |
|---|---|---|---|
| 6,685,804 B1 | 2/2004 | Ikeda et al. | |
| 6,887,511 B1 | 5/2005 | Shima et al. | |
| 7,179,561 B2 | 2/2007 | Niu et al. | |
| 7,192,673 B1 | 3/2007 | Ikeda et al. | |
| 7,195,842 B1 | 3/2007 | Fujimoto et al. | |
| 7,235,330 B1 | 6/2007 | Fujimoto et al. | |
| 7,241,533 B1 | 7/2007 | Ikeda et al. | |
| 7,410,728 B1 | 8/2008 | Fujimoto et al. | |
| 7,745,047 B2 | 6/2010 | Zhamu et al. | |
| 7,781,102 B2 | 8/2010 | Graetz et al. | |
| 7,794,881 B1 | 9/2010 | Fujimoto et al. | |
| 7,824,801 B2 | 11/2010 | Kogetsu et al. | |
| 7,842,432 B2 | 11/2010 | Niu et al. | |
| 7,939,218 B2 | 5/2011 | Niu | |
| 7,977,007 B2 | 7/2011 | Niu et al. | |
| 7,977,013 B2 | 7/2011 | Niu et al. | |
| 8,057,900 B2 | 11/2011 | Luhrs et al. | |
| 8,080,334 B2 | 12/2011 | Kogetsu et al. | |
| 8,257,866 B2 | 9/2012 | Loveness et al. | |
| 8,278,011 B2 | 10/2012 | Zhu et al. | |
| 8,450,012 B2 | 5/2013 | Cui et al. | |
| 8,556,996 B2 | 10/2013 | Loveness et al. | |
| 8,888,870 B2 | 11/2014 | Kogetsu et al. | |
| 9,045,346 B2 | 6/2015 | Nesper et al. | |
| 9,172,088 B2 | 10/2015 | Loveness et al. | |
| 9,172,094 B2 | 10/2015 | Loveness et al. | |
| 9,231,243 B2 | 1/2016 | Cui et al. | |
| 9,548,494 B2 | 1/2017 | Nesper et al. | |
| 9,815,691 B2 | 11/2017 | Oguni et al. | |
| 2005/0031780 A1 | 2/2005 | Matsui | |
| 2007/0131915 A1 | 6/2007 | Stankovich et al. | |
| 2008/0254296 A1 | 10/2008 | Handa et al. | |
| 2009/0110627 A1 | 4/2009 | Choi et al. | |
| 2009/0117467 A1 | 5/2009 | Zhamu et al. | |
| 2009/0123850 A1 | 5/2009 | Takeuchi et al. | |
| 2009/0253045 A1 | 10/2009 | Kotato et al. | |
| 2009/0317637 A1 | 12/2009 | Luhrs et al. | |
| 2010/0021819 A1 | 1/2010 | Zhamu et al. | |
| 2010/0078591 A1 | 4/2010 | Sano et al. | |
| 2010/0081057 A1 | 4/2010 | Liu et al. | |
| 2010/0143798 A1 | 6/2010 | Zhamu et al. | |
| 2010/0176337 A1 | 7/2010 | Zhamu et al. | |
| 2010/0233538 A1 | 9/2010 | Nesper et al. | |
| 2010/0233546 A1 | 9/2010 | Nesper et al. | |
| 2010/0248034 A1 | 9/2010 | Oki et al. | |
| 2010/0266898 A1 | 10/2010 | Yamamoto et al. | |
| 2010/0285358 A1* | 11/2010 | Cui | H01M 4/134 429/218.1 |
| 2010/0291438 A1 | 11/2010 | Ahn et al. | |
| 2010/0297502 A1 | 11/2010 | Zhu et al. | |
| 2010/0308277 A1 | 12/2010 | Grupp | |
| 2010/0330419 A1 | 12/2010 | Cui et al. | |
| 2010/0330421 A1 | 12/2010 | Cui et al. | |
| 2011/0012067 A1 | 1/2011 | Kay | |
| 2011/0020706 A1 | 1/2011 | Nesper | |
| 2011/0070146 A1 | 3/2011 | Song et al. | |
| 2011/0111299 A1 | 5/2011 | Liu et al. | |
| 2011/0111303 A1* | 5/2011 | Kung | H01B 1/18 429/231.8 |
| 2011/0121240 A1 | 5/2011 | Amine et al. | |
| 2011/0133131 A1 | 6/2011 | Zhou et al. | |
| 2011/0151290 A1 | 6/2011 | Cui et al. | |
| 2011/0159372 A1 | 6/2011 | Zhamu et al. | |
| 2011/0183203 A1 | 7/2011 | Du et al. | |
| 2011/0227000 A1 | 9/2011 | Ruoff et al. | |
| 2011/0229761 A1 | 9/2011 | Cui et al. | |
| 2011/0229795 A1 | 9/2011 | Niu et al. | |
| 2011/0266654 A1 | 11/2011 | Kuriki et al. | |
| 2011/0289767 A1 | 12/2011 | Yamazaki | |
| 2011/0292564 A1 | 12/2011 | Yamazaki | |
| 2011/0294005 A1 | 12/2011 | Kuriki et al. | |
| 2011/0294011 A1 | 12/2011 | Kuriki et al. | |
| 2011/0300445 A1 | 12/2011 | Murakami et al. | |
| 2011/0305950 A1 | 12/2011 | Kuriki et al. | |
| 2012/0003383 A1 | 1/2012 | Furuno | |
| 2012/0003530 A1 | 1/2012 | Kuriki et al. | |
| 2012/0003807 A1 | 1/2012 | Furuno et al. | |
| 2012/0015247 A1 | 1/2012 | Yoshida | |
| 2012/0045692 A1 | 2/2012 | Takemura et al. | |
| 2012/0058397 A1 | 3/2012 | Zhamu et al. | |
| 2012/0070738 A1 | 3/2012 | Yoshida | |
| 2012/0070741 A1 | 3/2012 | Liu et al. | |
| 2012/0088151 A1 | 4/2012 | Yamazaki et al. | |
| 2012/0088156 A1 | 4/2012 | Nomoto et al. | |
| 2012/0135302 A1 | 5/2012 | Yokoi et al. | |
| 2012/0156556 A1 | 6/2012 | Kuriki et al. | |
| 2012/0183856 A1 | 7/2012 | Cui et al. | |
| 2012/0308884 A1 | 12/2012 | Oguni et al. | |
| 2012/0308894 A1 | 12/2012 | Oguni et al. | |
| 2013/0043057 A1 | 2/2013 | Oguni et al. | |
| 2016/0013483 A1 | 1/2016 | Loveness et al. | |
| 2016/0190600 A1 | 6/2016 | Cui et al. | |

FOREIGN PATENT DOCUMENTS

| | | |
|---|---|---|
| CN | 101849302 A | 9/2010 |
| CN | 101916859 A | 12/2010 |
| CN | 101939867 A | 1/2011 |
| CN | 101964417 A | 2/2011 |
| CN | 102051651 A | 5/2011 |
| CN | 102064313 A | 5/2011 |
| CN | 102460782 A | 5/2012 |
| EP | 1231651 A | 8/2002 |

(56) References Cited

FOREIGN PATENT DOCUMENTS

| | | |
|---|---|---|
| EP | 1231653 A | 8/2002 |
| EP | 1231654 A | 8/2002 |
| EP | 1237210 A | 9/2002 |
| EP | 1244163 A | 9/2002 |
| EP | 1244164 A | 9/2002 |
| EP | 1246278 A | 10/2002 |
| EP | 1912270 A | 4/2008 |
| EP | 2228854 A | 9/2010 |
| EP | 2228855 A | 9/2010 |
| EP | 2256087 A | 12/2010 |
| EP | 2287946 A | 2/2011 |
| EP | 2427928 A | 3/2012 |
| IL | 204435 | 12/2010 |
| JP | 06-060870 A | 3/1994 |
| JP | 2000-215887 A | 8/2000 |
| JP | 2001-210315 A | 8/2001 |
| JP | 2002-063894 A | 2/2002 |
| JP | 2005-063772 A | 3/2005 |
| JP | 2006-196447 A | 7/2006 |
| JP | 2006-265751 A | 10/2006 |
| JP | 2008-103118 A | 5/2008 |
| JP | 2008-257894 A | 10/2008 |
| JP | 2009-524567 | 7/2009 |
| JP | 2009-176721 A | 8/2009 |
| JP | 2009-301937 A | 12/2009 |
| JP | 2010-003675 A | 1/2010 |
| JP | 2010-129332 A | 6/2010 |
| JP | 2010-219048 A | 9/2010 |
| JP | 2010-262752 A | 11/2010 |
| JP | 2010-275186 A | 12/2010 |
| JP | 2011-503804 | 1/2011 |
| JP | 2011-029184 A | 2/2011 |
| JP | 2011-048992 A | 3/2011 |
| JP | 2011-057541 A | 3/2011 |
| JP | 2011-517053 | 5/2011 |
| JP | 2011-105569 A | 6/2011 |
| JP | 2012-009414 A | 1/2012 |
| JP | 2012-099468 A | 5/2012 |
| JP | 2012-526364 | 10/2012 |
| JP | 2012-527735 | 11/2012 |
| KR | 2010-0088667 A | 8/2010 |
| KR | 2010-0103428 A | 9/2010 |
| KR | 2011-0009637 A | 1/2011 |
| KR | 2012-0024713 A | 3/2012 |
| TW | 201106522 | 2/2011 |
| TW | 201238125 | 9/2012 |
| TW | I595698 | 8/2017 |
| WO | WO-2001/031720 | 5/2001 |
| WO | WO-2006/062947 | 6/2006 |
| WO | WO-2007/061945 | 5/2007 |
| WO | WO-2009/061685 | 5/2009 |
| WO | WO-2009/127901 | 10/2009 |
| WO | WO-2009/144600 | 12/2009 |
| WO | WO-2010/129910 | 11/2010 |
| WO | WO-2010/135446 | 11/2010 |
| WO | WO-2010/138617 | 12/2010 |
| WO | WO-2010/138619 | 12/2010 |
| WO | WO-2011/109477 | 9/2011 |
| WO | WO-2011/119614 | 9/2011 |
| WO | WO-2011/136028 | 11/2011 |
| WO | WO-2011/149958 | 12/2011 |
| WO | WO-2012/046669 | 4/2012 |
| WO | WO-2012/054767 | 4/2012 |
| WO | WO-2013/027561 | 2/2013 |

OTHER PUBLICATIONS

Padhi.A et al., "Phospho-olivines as Positive-Electrode Materials for Rechargeable Lithium Batteries", J. Electrochem. Soc. (Journal of the Electrochemical Society), Apr. 1, 1997, vol. 144, No. 4, pp. 1188-1194.

Chan.C et al., "High-performance lithium battery anodes using silicon nanowires", Nature Nanotechnology, Dec. 16, 2007, vol. 3, pp. 31-35.

Yonezawa.Y et al., "Fabrication of Graphene Oxide Membrane by Electrophoretic Deposition", Proceedings of the 57th Spring Meeting, The Japan Society of Applied Physics and Related Societies, Mar. 17, 2010, pp. 17-040.

Suganuma.K et al., "Fabrication of a solution-processed organic thin film transistor with a transparent graphene thin film gate electrode", The 57th Japan Society of Applied Physics and Related Societies, 2010, pp. 12-374.

Su.F et al., "Flexible and planar graphene conductive additives for lithium-ion batteries", J. Mater. Chem. (Journal of Materials Chemistry), 2010, vol. 20, pp. 9644-9650.

Zhou.X et al., "Graphene modified LiFePO4 cathode materials for high power lithium ion batteries", J. Mater. Chem. (Journal of Materials Chemistry), 2011, vol. 21, pp. 3353-3358.

Yu.G et al., "Solution-Processed Graphene/MnO2 Nanostructured Textiles for High-Performance Electrochemical Capacitors", Nano Letters, 2011, vol. 11, No. 7, pp. 2905-2911.

PCT Written Opinion of the International Searching Authority, PCT/JP2012/069929, dated Oct. 9, 2012.

PCT International Search Report, PCT/JP2012/069929, dated Oct. 9, 2012.

Taiwanese Office Action (Application No. 101129385) dated Feb. 15, 2016.

Wang.X et al., "Transparent,Conductive Graphene Electrodes for Dye-Sensitized tized Solar Cells", Nano Letters, 2008, vol. 8, No. 1, pp. 323-327.

Lv.W et al., "Low-Temperature Exfoliated Graphenes: Vacuum-Promoted Exfoliation and Electrochemical Energy Storage", ACS Nano, Nov. 24, 2009, vol. 3, No. 11, pp. 3730-3736.

Taiwanese Office Action (Application No. 106117221) dated Dec. 12, 2017.

* cited by examiner

METHOD FOR MANUFACTURING GRAPHENE-COATED OBJECT, NEGATIVE ELECTRODE OF SECONDARY BATTERY INCLUDING GRAPHENE-COATED OBJECT, AND SECONDARY BATTERY INCLUDING THE NEGATIVE ELECTRODE

TECHNICAL FIELD

The present invention relates to single-layer graphene, which is one atomic layer of a sheet of carbon molecules having π bonds, multilayer graphene in which 2 sheets or more and 100 sheets or less of the single-layer graphene are stacked, and a method for manufacturing the single-layer or multilayer graphene. In this specification, single-layer graphene and multilayer graphene are simply collectively referred to as graphene.

The present invention also relates to a negative electrode of a secondary battery and a secondary battery including the negative electrode.

BACKGROUND ART

Attempts have been made to apply graphene to a variety of products because of its excellent electric characteristics such as high conductivity and high mobility and its excellent physical characteristics such as sufficient flexibility and high mechanical strength (see Patent Documents 1 to 3).

Here, in a commercially available secondary battery, which is a rechargeable power storage device, a carbon material such as graphite is used for a negative electrode. Graphite has a crystal structure where sheets of carbons which have $sp^2$ hybrid orbitals and are regularly arranged two-dimensionally are stacked. The secondary battery is charged and discharged utilizing occlusion of lithium ions from a positive electrode into a gap between sheets of carbons in the crystal structure.

Other than graphite, carbon materials which are suitable as negative electrode materials of lithium-ion secondary batteries have been researched (Patent Document 4). Such carbon materials contain carbon particles containing a metal which forms an alloy with lithium and have gaps between the carbon particles, in order that high lithium occlusion/release capacity and prevention of possibilities of damages due to continuous charge/discharge can be achieved.

A material which generates electricity by being directly involved in cell reaction is called an active material of a battery. Although it is preferable to reduce the particle size of an active material of an electrode in terms of higher power of a secondary battery, when the particle size is reduced, a conductive additive and a binder are needed to efficiently construct a conductive network. However, a conductive additive and a binder decrease capacity per unit volume of an electrode, which is a problem. Therefore, a battery which does not include a conductive additive and a binder and in which an active material is supported by whiskers between an active material layer and a surface of a current collector has been studied (Patent Document 5). In Patent Document 5, as examples of active materials, lithium manganese oxide, lithium nickel oxide, lithium cobalt oxide, lithium iron phosphate, lithium titanate, graphite, and hard carbon are given, and as examples of whisker materials, carbon, potassium titanate, titanium carbide, silicon carbide, titanium dioxide, zinc oxide, magnesium oxide, tin dioxide, and indium oxide are given.

It is known that occlusion of lithium released from a positive electrode expands and, further, crushes a negative electrode. To solve this problem, a structure where particles of a metal or a semimetal which form a lithium alloy serve as cores and the cores are coated with carbon has been suggested (Patent Document 6). Patent Document 6 discloses that silicon particles are preferred as particles serving as cores and a chemical vapor deposition method is employed as a carbon coating method.

REFERENCE

[Patent Document 1] U.S. Patent Application Publication No. 2011/0070146
[Patent Document 2] U.S. Patent Application Publication No. 2009/0110627
[Patent Document 3] U.S. Patent Application Publication No. 2007/0131915
[Patent Document 4] Japanese Published Patent Application No, 2011-057541
[Patent Document 5] Japanese Published Patent Application No. 2008-103118
[Patent Document 6] Japanese Published Patent Application No. 2000-215887

DISCLOSURE OF INVENTION

As described in Patent Documents 1 to 3, a chemical vapor deposition (CVD) method and a coating method are main manufacturing methods of graphene. In a CVD method, for example, as described in Patent Documents 1 and 2, a metal serving as a catalyst is heated and a hydrocarbon gas is supplied to the metal, so that graphene is grown on the catalyst.

In a coating method, as described in Patent Document 3, graphene oxide, which is obtained by oxidizing graphite, is dispersed in a solution, a graphene oxide film is formed by application of the solution, and then the graphene oxide is reduced to obtain graphene.

Graphene can be formed on a plane surface by either method. However, it is difficult to form graphene on an object having an uneven surface or a complex surface, in particular, an object having a surface with a three-dimensional structure due to complex unevenness, or an object having a curved surface. In a CVD method, graphene is formed only on a catalyst; therefore, formed graphene needs to be separated and transferred to a target object. If the object has an uneven surface, a complex surface, or a curved surface, it is impossible to transfer the formed graphene thereto. In a coating method, it is difficult to form graphene on projections and depressions of an uneven object to have a practically even thickness, and difficult to sufficiently form graphene entirely on a three-dimensional surface due to complex unevenness. In general, graphene is formed thin on projections, or cannot be formed on projections, depending on cases. In contrast, graphene is formed extremely thick in depressions, or is not formed in depressions and thus a gap is formed between graphene and the concave surfaces.

An object of one embodiment of the present invention is to form graphene on such an object having an uneven surface or a complex surface, in particular, an object having a surface with a three-dimensional structure due to complex unevenness, or such an object having a curved surface. Another object of one embodiment of the present invention is to provide a method for forming graphene on such an object. Another object of one embodiment of the present invention is to provide a device in which graphene is formed on such an object.

In a secondary battery having the structure disclosed in Patent Document 4, carbon particles cannot be fully arranged because there are gaps between the carbon particles in the secondary battery. In the structures disclosed in Patent Documents 4 to 6, active materials have particle shapes; thus, there is a limitation on occlusion and release of lithium ions.

In view of the above problems, another object of one embodiment of the present invention is to use a non-spherical material, in particular, a film-like carbon-based material, as an electrode material.

One embodiment of the present invention will be described. First, graphene oxide is dispersed in a proper solution. Graphene oxide is single-layer graphene, which is one atomic layer of a sheet of carbon molecules, or multi-layer graphene in which a plurality of sheets of single-layer graphene are stacked, and part of an end of a graphene sheet having a certain size is terminated with a carboxyl group (—COOH). For this reason, in a solution such as water, a hydrogen ion is separated from a carboxyl group and graphene oxide itself becomes negatively charged. This property is utilized to form a graphene oxide film on a surface of an object by an electrophoresis method. Specifically, a cathode and an object on which graphene is to be formed and which serves as an anode are immersed in a solution in which graphene oxide is dispersed, and a potential difference is applied between the anode and the cathode, whereby negatively charged graphene oxide is attracted to the anode and deposited on a surface of the object, resulting in formation of graphene oxide coating the surface of the object.

When graphene oxide is formed on a surface of an object by electrophoresis, graphene oxide is deposited on a portion of the surface of the object graphene oxide is not deposited. In other words, a portion where graphene oxide is deposited is unlikely coated with another graphene oxide. FIGS. 1A to 1C schematically illustrate a process through which graphene oxide is deposited on a surface of an object. In the case where graphene oxide 102 is deposited on a surface of an object 101 immersed in a proper solution 100, another graphene oxide 103 is not deposited on the deposited graphene oxide 102 but is deposited on a portion of the surface of the object where graphene oxide is not deposited (see FIGS. 1A and 1B). This is because graphene oxide is an insulator which has sufficiently lower conductivity than graphene, so that electrodeposition using electrophoresis/electrophretic deposition does not proceed in the portion of the surface of the object where graphene oxide is deposited. This is also because graphene oxide is negatively charged and thus graphene oxide sheets electrostatically repel each other. A surface of graphene oxide is in contact with the surface of the object because a carboxyl group of the graphene oxide from which a hydrogen ion is released is bonded to the object. A carboxyl group of the graphene oxide from which a hydrogen ion is released and the object may be bonded to each other, resulting in neutralization. On the other hand, in a surface of the deposited graphene oxide on the aqueous solution side, i.e., the exposed opposite surface, a hydrogen ion is still released from a carboxyl group, and thus the opposite surface is negatively charged. Accordingly, after being completely coated with graphene oxide, the object is unlikely to be further coated with another graphene oxide (see FIG. 1C).

Through such a process, graphene oxide coating is performed; thus, the thickness of the graphene oxide formed on the surface of the object is practically uniform. Further, even if the object has an uneven surface, a complex surface, or a curved surface, graphene oxide can be effectively deposited thereon in principle. In particular, even in the case where the object has a surface with a three-dimensional structure due to complex unevenness, since the size of a graphene oxide sheet is sufficiently smaller than that of the object, the graphene oxide sheet can move around the complex three-dimensional structure, and thus, graphene oxide can be deposited on the entire surface of the object. Graphene oxide which enters in a depression of the structure is to be deposited on a portion where graphene oxide is not deposited.

After that, graphene oxide is heated in an appropriate atmosphere such as a vacuum atmosphere or a reducing atmosphere to reduce the graphene oxide, so that graphene can be formed on the surface of the object. Note that graphene may contain an element other than carbon and oxygen at 15 at. % or less or an element other than carbon at 30 at. % or less. The length of one side of the graphene oxide sheet is, depending on the shape or the size of the object, which is to be coated with graphene oxide, preferably 10 µm or less. This is because even when the object has an uneven surface or a complex surface, the surface can be coated with graphene oxide more elaborately and reliably.

Note that the surface of the object, on which graphene is formed, may have conductivity, or may be provided with a nonconductive substance as long as electrodeposition using electrophoresis/electrophretic deposition can be performed.

According to one embodiment of the present invention, a film-like carbon-based material (carbon-based film) is used as an electrode material of a secondary battery. The film-like carbon-based material is in contact with projections of an uneven shape and covers the uneven shape. That is to say, the film-like carbon-based material can be provided on the projections. The uneven shape may be formed in a current collector or formed using an active material.

According to one embodiment of the present invention, a carbon-based film closely in contact with projections can be provided as an electrode material of a secondary battery. That is, the carbon-based film can be provided around the projections.

The film-like carbon-based material includes 2 sheets or more and 1000 sheets or less, preferably 100 sheets or more and 300 sheets or less of graphene. When two to three sheets of graphene are stacked, the thickness of the carbon-based material is 1 nm to 2 nm. The film-like carbon-based material may be either amorphous or crystalline.

The length of the projection is 2 to 10000 times, preferably 10 to 100 times as long as of the diameter thereof. The projections have columnar shapes. Long projections are difficult to be formed perpendicularly to a current collector; thus, the projections may be bended or inclined. The projection may also be beaded depending on a material of the projections. For those reasons, the projections can be expressed as whisker-like projections.

Although difficult in the case of employing a conventional method, it becomes possible to form graphene on an object having an uneven surface or a complex surface, in particular, an object having a surface with a three-dimensional structure due to complex unevenness, or an object having a curved surface.

Further, graphene can be formed on the entire surface of an object having an uneven surface or a complex surface, in particular, an object having a surface with a three-dimensional structure due to complex unevenness, or an object having a curved surface, to have a practically even thickness.

Even when an object whose surface is coated with graphene with a practically even thickness expands for some reason, the object can be prevented from being crushed, owing to sufficient flexibility of the graphene.

The use of a film-like carbon-based material as a negative electrode active material of a secondary battery is advantageous in terms of a short diffusion path of lithium in the active material. The use of a film-like carbon-based material as a conductive additive of an electrode of a secondary battery is advantageous because a wide conductive network can be constructed.

BEST MODE FOR CARRYING OUT THE INVENTION

Embodiments and examples of the present invention will be described below. Note that the embodiments and examples can be implemented in various modes. It will be readily appreciated by those skilled in the art that the modes and details can be changed in various ways without departing from the spirit and scope of the present invention. Thus, the present invention should not be interpreted as being limited to the following description of the embodiments and examples.

(Embodiment 1)

In this embodiment, a method for forming graphene on a surface of an object will be described. Graphene oxide is obtained in such a manner that graphite is oxidized to form graphite oxide and the graphite oxide is subjected to ultrasonic vibrations. For the details, refer to Patent Document 3. Alternatively, commercially available graphene oxide may be used.

Graphene oxide is dispersed in a solvent such as water, chloroform, N,N-dimethylformamide (DMF), or N-methylpyrrolidone (NMP). The solvent is preferably a polar solvent. Graphene oxide may have a concentration of 0.1 g to 10 g per liter.

Figure 1A:
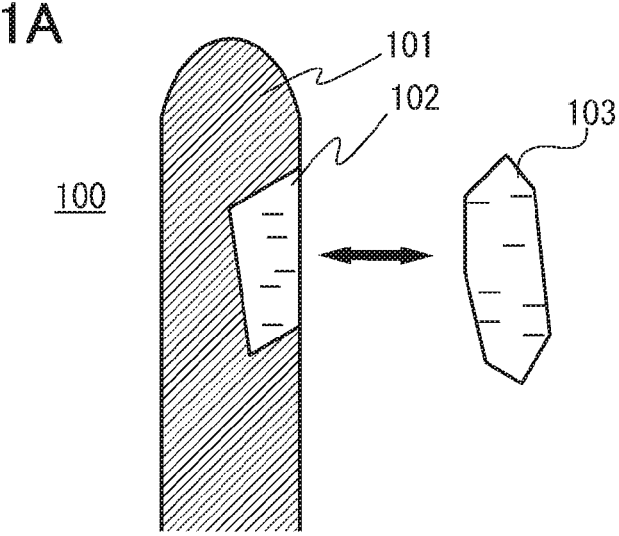
FIGS. 1A to 1C illustrate a formation method of graphene of one embodiment of the present invention.
Figure 1B:
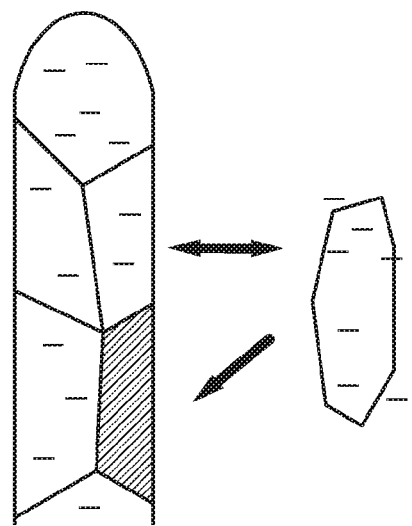
Figure 1C:
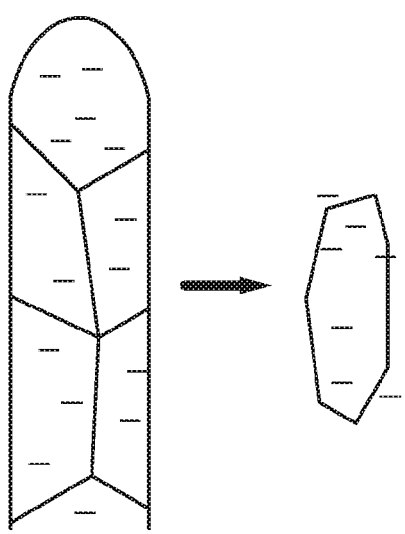
Figure 2:
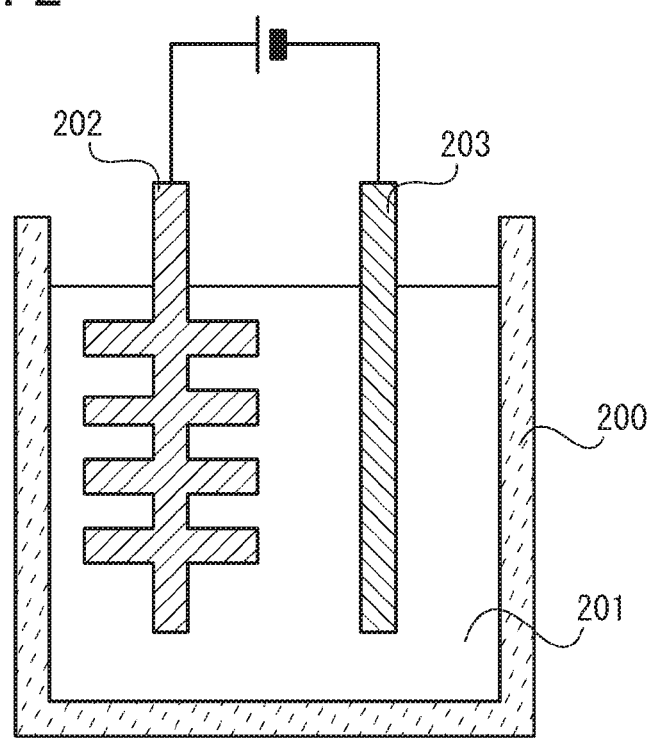
FIG. 2 illustrates an apparatus used in one embodiment.

FIG. 2 illustrates an apparatus used in this embodiment. A solution 201, in which graphene oxide is dispersed, is put in a container 200, and an object 202, on which graphene is to be deposited, is put therein and is used as an anode. In addition, a conductor 203 serving as a cathode is put in the solution, and electrodeposition using electrophoresis/electrophretic deposition is performed with an appropriate voltage (e.g., 5 V to 20 V) applied between the anode and the cathode (such an electrodeposition/a deposition method is hereinafter referred to as an electrophoresis method). Note that the voltage does not necessarily have to be constant. By measuring the amount of charge flowing between the anode and the cathode, the thickness of graphene oxide deposited on the object can be estimated. The deposition of graphene oxide on the anode stops when the anode is entirely coated. Thus, when the time needed for entirely coating the anode with graphene oxide is determined in advance, entire coating can be completed in the shortest time.

When the deposition of graphene oxide is completed, the object is taken out of the solution and dried. Further, the object is heated at 150° C. or higher, preferably 200° C. or higher in a vacuum or in a reducing atmosphere such as an inert gas (nitrogen, a rare gas, or the like) atmosphere. When the heating temperature is higher and the heating time is longer, graphene oxide is reduced to a higher extent, so that graphene with higher purity (i.e., with a lower concentration of elements other than carbon) can be obtained. Note that graphene oxide is known to be reduced at a heating temperature of 100° C. or higher. Although a higher heating temperature is preferable, the heating temperature should be determined in consideration of the reactivity with the object.

Note that it is preferable to perform the heating treatment at a high temperature in order to obtain graphene having high electron conductivity. For example, when graphene oxide on a glass substrate is heated to be reduced to graphene, the resistivity of multilayer graphene is about 240 MΩcm at a heating temperature of 100° C. (1 hour); however, the resistivity is 4 kΩcm at a heating temperature of 200° C. (1 hour) and 2.8 Ωcm at a heating temperature of 300° C. (1 hour) (each resistivity is the average value of eight samples).

In the aforementioned manner, the graphene oxide formed on a surface of the object is reduced to be graphene. At this time, graphene and the adjacent graphene are bonded to each other to form a huge sheet-like or net-like network (such a network is hereinafter referred to as a graphene net) as a whole. Even in the case where the object has depressions and projections, the graphene formed in such a manner has a substantially even thickness also on the depressions and the projections. The same applies to the case where the object has a curved surface.

(Embodiment 2)

In this embodiment, an electrode including a film-like carbon-based material will be described.

Figure 11:
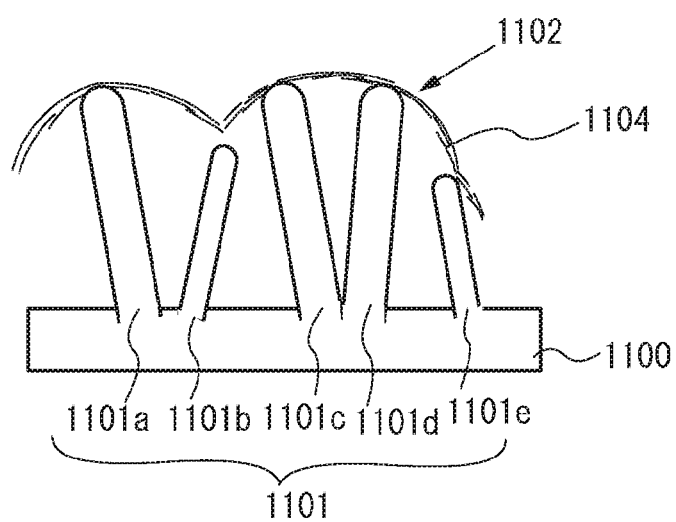
FIG. 11 illustrates an electrode of one embodiment of the present invention.

As illustrated in FIG. 11, an electrode includes a current collector 1100 and a film-like carbon-like material 1102. The film-like carbon-based material 1102 may be provided over the current collector 1100 and is preferably supported so as to have a large surface area. For example, the film-like carbon-based material 1102 is supported by a plurality of projections 1101 (respectively referred to as 1101a to 1101e) on the current collector 1100. In other words, the film-like carbon-based material 1102 can be provided over the plurality of projections 1101.

The film-like carbon-based material 1102 includes 1 sheet or more and 1000 sheets or less, preferably 100 sheets or more and 300 sheets or less of graphene 1104. The graphene net is different from graphite in any of the following.

Van der Waals force forms a bond in the stacking direction (z-axis direction).
The number of stacked sheets is large.
The edges of the sheets are not aligned.
The number of ring members of carbon which consist one sheet is large, e.g., 9 or more; thus, a gap is large.

The graphene net having any of the above features can increase the occlusion rate of lithium ions. Further, the graphene net has a film shape and thus is advantageous in occlusion and release of lithium ions.

The thickness of two to three sheets of the film-like carbon-based material is 1 nm to 2 nm. The film-like carbon-based material may be either amorphous or crystalline.

The film-like carbon-based material has conductivity. The film-like carbon-based material can be used as a conductive additive in a negative electrode. The film-like carbon-based material is effective as the conductive additive because of its large surface area.

The film-like carbon-based material can be used as an active material of a negative electrode. The film-like carbon-based material occludes lithium. The number of sheets of graphene is 1 to 1000 inclusive, preferably 100 to 300 inclusive. This is because as the number of sheets of graphene is increased, lithium can be occluded more efficiently.

The film-like carbon-based material can construct a conductive network by itself in contrast to a spherical carbon-based material. The film-like carbon-based material also serves as a binder and/or a conductive additive, so that it is possible to reduce or omit addition of a binder and/or a conductive additive. Accordingly, the amount of the active material can be increased.

The film-like carbon-based material may be provided so as to cover surfaces of the plurality of projections 1101, that is, may be provided along the plurality of projections 1101a to 1101e. The film-like carbon-based material may be provided without a gap between the adjacent projections. For example, the film-like carbon-based material is provided without a gap between the projection 1101a and the projection 1101b. The amount of graphene can be increased.

To provide the film-like carbon-based material over the plurality of projections 1101, the electrophoresis method is used. In the method, an aqueous solution in which graphene oxide is dispersed is used and voltage is applied for a certain period of time. Forming conditions and the like will be described in examples below.

Alternatively, an immersion method may be employed to provide the film-like carbon-based material over the plurality of projections 1101, as a method different from an electrophoresis method. In an immersion method, a current collector provided with a plurality of projections is immersed in an aqueous solution in which graphene oxide is dispersed, without voltage application. In the case of employing this method, a gap is provided between the film-like carbon-based material and the plurality of projections 1101 in some cases.

The plurality of projections 1101 can be formed on a surface of the current collector 1100. Alternatively, the plurality of projections 1101 can be formed by partly removing a surface of the current collector 1100.

The diameter of each of the plurality of projections 1101a to 1101e is 50 nm to 10 μm inclusive, preferably 500 nm to 3 μm inclusive. The length along the axis of the projection is 0.5 μm to 1000 μm inclusive, preferably 1 μm to 100 μm inclusive, The length is 2 to 10000 times, preferably 10 to 100 times as long as the diameter. The shapes of the projections are referred to as columnar shapes. Side surfaces of the projections are preferably rounded. The shapes of such projections are referred to as cylinder shapes. Further, the tips of the projections are preferably rounded. The rounded tips prevent the film-like carbon-based material from being cracked or damaged. The projections may have spherical or semispherical (dome-like) shapes.

The plurality of projections may have whisker-like shapes. In this case, the shapes of the plurality of projections are different from each other. Whisker-like projections are difficult to be formed perpendicularly to the current collector because they are long. The whisker-like projections may be bended or inclined. The whisker-like projections close to each other may be entangled with each other or may be linked with each other. One of the whisker-like projections may curl up into a ring-like shape.

For the whisker-like projections, silicon whiskers can be used. The plurality of projections are not limited to silicon whiskers; they may be either amorphous or crystalline. When the plurality of projections are amorphous, they are less likely to break as compared to the case where they are crystalline. When the plurality of projections are silicon whiskers, they are preferably crystalline in core portions and amorphous around the core portions. In that case, the plurality of projections can have an advantage of being unlikely to break in addition to a certain degree of strength.

In a negative electrode including silicon whiskers and the film-like carbon-based material, each of the silicon whiskers and the film-like carbon-based material can serve as an active material. Thus, the negative electrode can have both a lithium-occluding property of silicon and a lithium-occluding property of carbon. In other words, the negative electrode can have excellent lithium-occluding ability attributed to both the lithium-occluding ability of silicon and the lithium-occluding ability of carbon.

The shapes and the arrangement of the plurality of projections 1101a to 1101e are not particularly limited as long as they can support the film-like carbon-based material. Even one projection can support the film-like carbon-based material. The film-like carbon-based material supported by one projection hangs down toward the current collector. The film-like carbon-based material provided to hang down toward the current collector can have a larger surface area.

As described above, a long projection may possibly break. Occlusion of lithium in the projection increases a possibility of breakage. The film-like carbon-based material can prevent the projection from breaking.

The use of such a film-like carbon-based material for a negative electrode of a secondary battery is advantageous in occlusion and release of lithium ions as compared to the case of using a spherical carbon-based material. Further, when 2 sheets or more and 1000 sheets or less, preferably 100 sheets or more and 300 sheets or less of graphene is used, lithium is occluded in a gap between the sheets, so that lithium can be occluded more efficiently as compared to the case of using a spherical active material.

(Embodiment 3)

In this embodiment, a structure where a carbon-based material is provided around the plurality of projections 1101 will be described.

Figure 12:
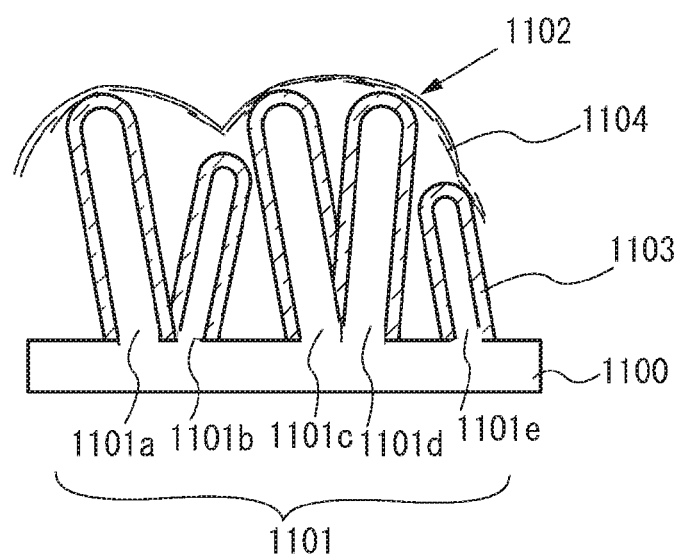
FIG. 12 illustrates an electrode of one embodiment of the present invention.

As illustrated in FIG. 12, a carbon-based material 103 is provided to coat the plurality of projections 1101. The carbon-based material 1103 includes 1 sheet or more and 1000 sheets or less, preferably 100 sheets or more and 300 sheets or less of the graphene 1104. When two to three sheets of graphene are stacked, the thickness of the carbon-based material is 1 nm to 2 nm. The film-like carbon-based material may be either amorphous or crystalline.

Embodiment 2 can be referred to for the structure of the other components, and the film-like carbon-based material 1102 can be provided.

The carbon-based material has conductivity. Therefore, it can be used as a conductive additive in a negative electrode. It is advantageous to provide the film-like carbon-based material 1102 described in Embodiment 2 along with the carbon-based material 1103 because the plurality of carbon-based materials favorably function as conductive additives.

Alternatively, the carbon-based material may be used as an active material. When the film-like carbon-based material 1102 described in Embodiment 2 is provided, both the film-like carbon-based material 1102 and the carbon-based material 1103 can be used as active materials. Alternatively, the carbon-based material 1103 and the film-like carbon-based material 1102 may be used as an active material and a conductive additive, respectively. In either case, the plurality of carbon based materials provided improve the function of an electrode.

(Embodiment 4)

In this embodiment, a laminated secondary battery having a negative electrode of one embodiment of the present invention will be described.

Figure 13A:
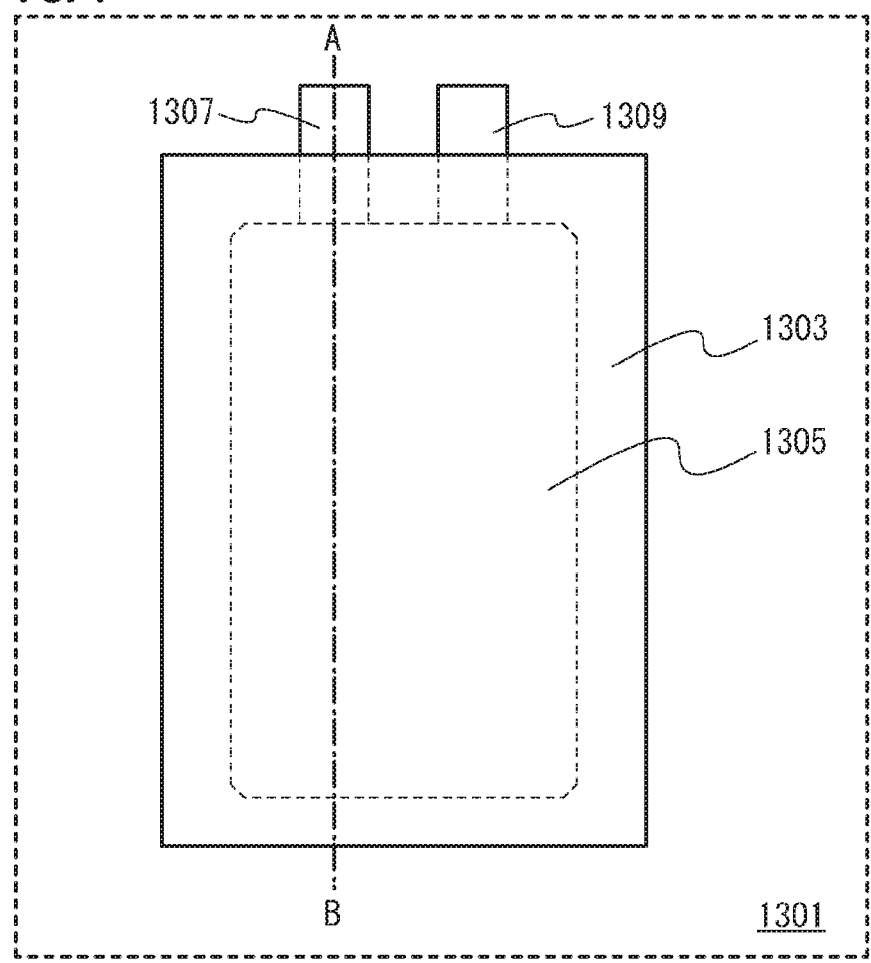
FIGS. 13A and 13B illustrate a battery of one embodiment of the present invention.
Figure 13B:
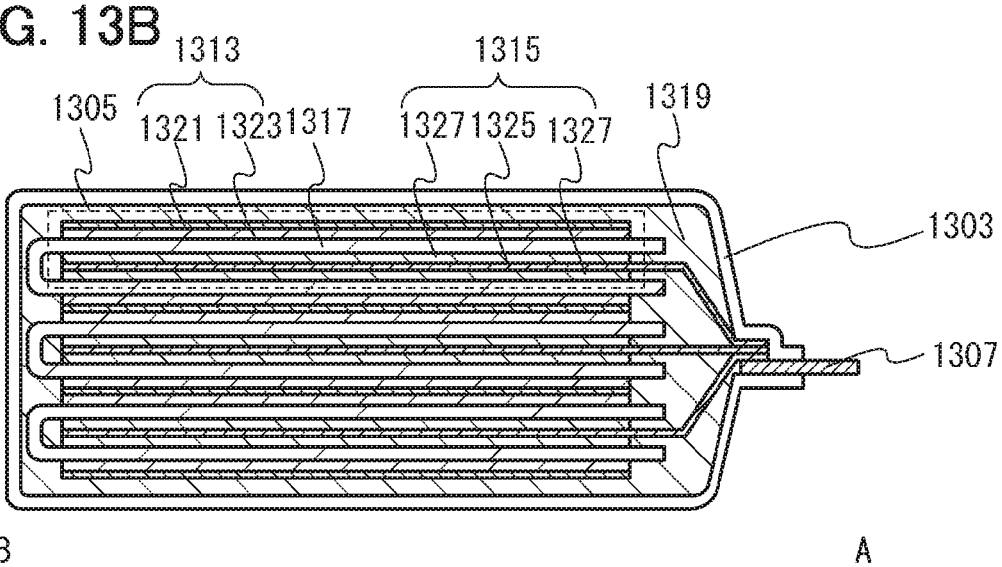

FIG. 13A is a plan view of a laminated secondary battery 1301, and FIG. 13B is a cross-sectional view along dashed dotted line A-B in FIG. 13A. The laminated secondary battery 1301 illustrated in FIG. 13A includes a power storage cell 1305 in an exterior member 1303. The laminated secondary battery 1301 further includes a terminal portion 1307 and a terminal portion 1309, which are connected to the power storage cell 1305. For the exterior member 1303, a laminate film, a polymer film, a metal film, a metal case, a plastic case, or the like can be used.

As illustrated in FIG. 13B, the power storage cell 1305 includes a negative electrode 1313, a positive electrode 1315, a separator 1317, and an electrolyte solution 1319. The separator 1317 is provided between the negative electrode 1313 and the positive electrode 1315. The exterior member 1303 is filled with the electrolyte solution 1319.

The negative electrode 1313 is formed according to the above embodiment and includes at least a negative electrode current collector 1321 and a negative electrode active material layer 1323. The positive electrode 1315 includes at least a positive electrode current collector 1325 and a positive electrode active material layer 1327. The negative electrode active material layer 1323 can be provided on one surface or opposite surfaces of the negative electrode current collector 1321. In other words, the film-like carbon-based material may be formed on either one surface or opposite surfaces of the negative electrode current collector 1321. The positive electrode active material layer 1327 is provided on one surface or opposite surfaces of the positive electrode current collector 1325.

The negative electrode current collector 1321 is connected to the terminal portion 1309. The positive electrode current collector 1325 is connected to the terminal portion 1307. Further, the terminal portions 1307 and 1309 each partly extend outside the exterior member 1303.

Note that although a sealed thin secondary battery is described as the laminated secondary battery 1301 in this embodiment, the external shape of the secondary battery is not limited thereto and can be any of a variety of shapes such as a button shape, a cylindrical shape, or a rectangular shape. Further, although the structure where the positive electrode, the negative electrode, and the separator are stacked is described in this example, a structure where the positive electrode, the negative electrode, and the separator are rolled may be employed.

As a material of the positive electrode current collector 1325, aluminum, stainless steel, or the like is used. The shape of the positive electrode current collector 1325 can be a foil shape, a plate shape, a net shape, or the like.

The positive electrode active material layer 1327 can be formed using any of $LiFeO_2$, $LiCoO_2$, $LiNiO_2$, $LiMn_2O_4$, $LiFePO_4$, $LiCoPO_4$, $LiNiPO_4$, $LiMnPO_4$, $V_2O_5$, $Cr_2O_5$, $MnO_2$, and other lithium compounds as a material. Note that when carrier ions are alkali metal ions other than lithium ions, alkaline earth metal ions, beryllium ions, or magnesium ions, the positive electrode active material layer 1327 can be formed using, instead of lithium in the above lithium compounds, an alkali metal (e.g., sodium or potassium), an alkaline earth metal (e.g., calcium, strontium, or barium), beryllium, or magnesium.

As a solute of the electrolyte solution 1319, a material containing lithium ions, i.e., carrier ions, is used. Examples of the solute of the electrolyte solution 1319 include lithium salts such as $LiClO_4$, $LiAsF_6$, $LiBF_4$, $LiPF_6$, and $Li(C_2F_5SO_2)_2N$. Note that when carrier ions are alkali metal ions other than lithium ions or alkaline earth metal ions, alkali metal salt (e.g., sodium salt or potassium salt), alkaline earth metal salt (e.g., calcium salt, strontium salt or barium salt), beryllium salt, magnesium salt, or the like can be used as the solute of the electrolyte solution 1319.

As the solvent of the electrolyte solution 1319, a material in which lithium ions can transfer is used. As the solvent of the electrolyte solution 1319, an aprotic organic solvent is preferably used. Examples of the aprotic organic solvent include ethylene carbonate, propylene carbonate, dimethyl carbonate, diethyl carbonate, γ-butyrolactone, acetonitrile, dimethoxyethane, tetrahydrofuran, and the like, and one or more of these materials can be used. When a gelled high-molecular material is used as the solvent of the electrolyte solution 1319, safety against liquid leakage and the like is improved and the secondary battery 1301 can be thinner and more lightweight. Examples of the gelled high-molecular material include a silicon gel, an acrylic gel, an acrylonitrile gel, polyethylene oxide, polypropylene oxide, and a fluorine-based polymer.

As the electrolyte solution 1319, a solid electrolyte such as $Li_3PO_4$ can be used.

As the separator 1317, an insulating porous material is used. Examples of the separator 1317 include cellulose (paper), polyethylene, and polypropylene.

The use of the film-like carbon-based material of one embodiment of the present invention as an electrode material of a negative electrode can improve lithium occlusion efficiency of a secondary battery.

(Embodiment 5)

As an example of a secondary battery of one embodiment of the present invention, a coin secondary battery will be described with reference to FIG. 8.

Figure 8:
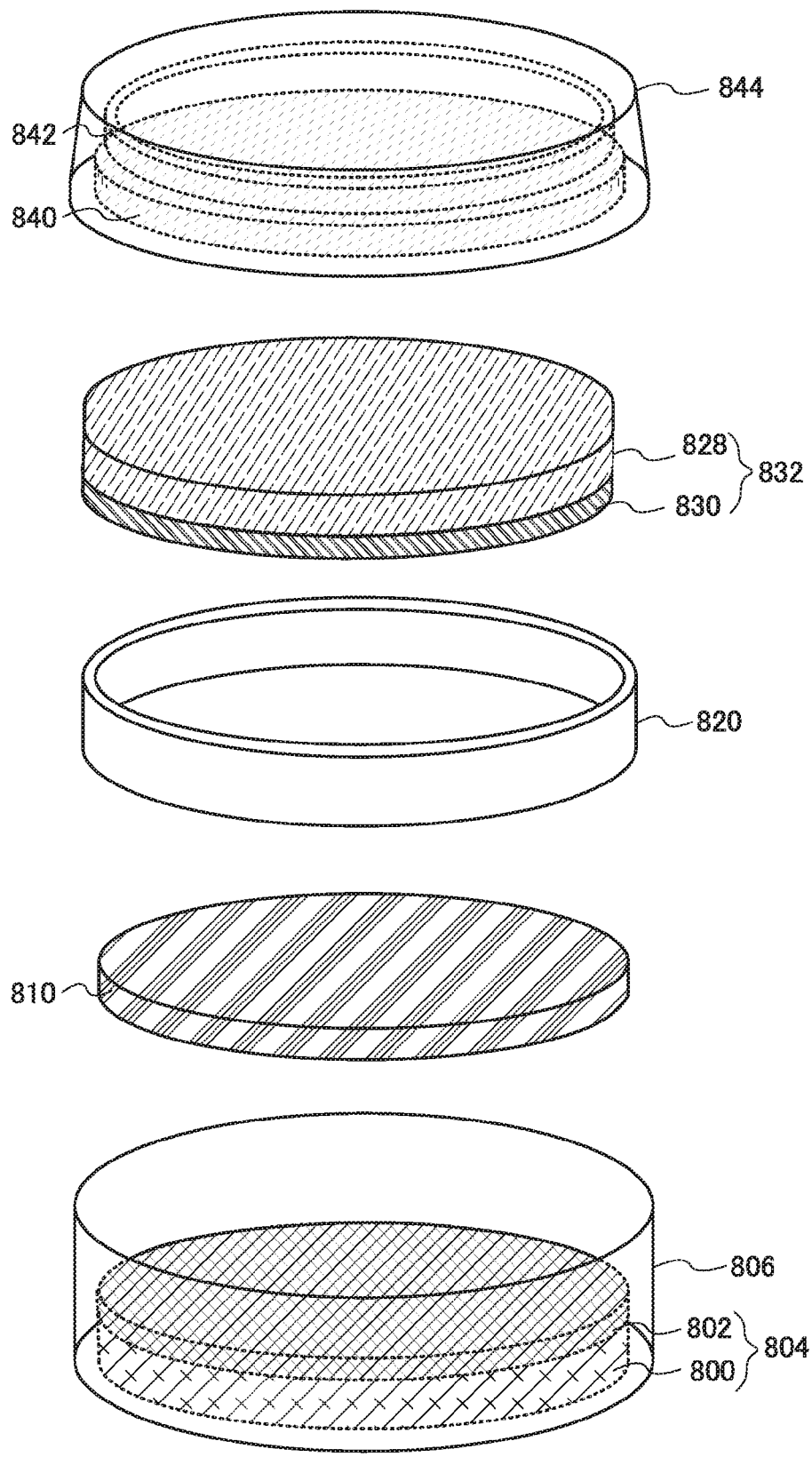
FIG. 8 illustrates a structure of a coin secondary battery.

As illustrated in FIG. 8, the coin secondary battery includes a negative electrode 804, a positive electrode 832, a separator 810, an electrolyte solution (not illustrated), a housing 806, and a housing 844. Besides, the coin secondary battery includes a ring-shaped insulator 820, a spacer 840, and a washer 842.

The negative electrode 804 includes a negative electrode active material layer 802 over a negative electrode current collector 800. For the negative electrode active material layer 802, silicon having whisker-like structure bodies whose surfaces are coated with graphene sufficiently and evenly is used. Specifically, when the film-like carbon-based material of one embodiment of the present invention is used as an electrode material of the negative electrode, lithium occlusion efficiency of the secondary battery can be improved. As the negative electrode current collector 800, copper may be used, for example.

As a material of a positive electrode current collector 828, aluminum is preferably used. A positive electrode active material layer 830 may be formed in such a manner that slurry in which positive electrode active material particles, a binder, and a conductive additive are mixed is applied on the positive electrode current collector 828 and is dried.

As the positive electrode active material, lithium cobalt oxide, lithium iron phosphate, lithium manganese phosphate, lithium manganese silicate, lithium iron silicate, or the like can be used; however, one embodiment of the present invention is not limited thereto. The size of the active material particle is preferably 20 nm to 100 nm. Further, a carbohydrate such as glucose may be mixed at the time of baking of the positive electrode active material particles so that the positive electrode active material particles are coated with carbon. This treatment can improve the conductivity.

The electrolyte solution in which $LiPF_6$ is dissolved in a mixed solvent of ethylene carbonate (EC) and diethyl carbonate (DEC) is preferably used; however, one embodiment of the present invention is not limited thereto.

An insulator with pores (e.g., polypropylene) may be used for the separator 810. Alternatively, a solid electrolyte which can transmit lithium ions may be used.

The housing 806, the housing 844, the spacer 840, and the washer 842 each of which is made of a metal (e.g., stainless steel) are preferably used. The housing 806 and the housing 844 have a function of electrically connecting the negative electrode 804 and the positive electrode 832 to the outside.

The negative electrode 804, the positive electrode 832, and the separator 810 are immersed in the electrolyte solution. Then, as illustrated in FIG. 8, the negative electrode 804, the separator 810, the ring-shaped insulator 820, the positive electrode 832, the spacer 840, the washer 842, and the housing 844 are stacked in this order with the housing 806 positioned at the bottom, and the housing 806 and the housing 844 are subjected to pressure bonding. In such a manner, the coin secondary battery is manufactured.

This embodiment can be implemented in appropriate combination with any of the other embodiments.

(Embodiment 6)

The secondary battery of one embodiment of the present invention can be used for power supplies of a variety of electric appliances which can be operated with power.

Specific examples of electric appliances each utilizing the secondary battery of one embodiment of the present invention are as follows: display devices, lighting devices, desktop personal computers and laptop personal computers, image reproduction devices which reproduce still images and moving images stored in recording media such as digital versatile discs (DVDs), mobile phones, portable game machines, portable information terminals, e-book readers, video cameras, digital still cameras, high-frequency heating appliances such as microwave ovens, electric rice cookers, electric washing machines, air-conditioning systems such as air conditioners, electric refrigerators, electric freezers, electric refrigerator-freezers, freezers for preserving DNA, and dialyzers. In addition, moving objects driven by electric motors using power from secondary batteries are also included in the category of electric appliances. Examples of the moving objects include electric vehicles, hybrid vehicles each including both an internal-combustion engine and an electric motor, and motorized bicycles including motor-assisted bicycles.

In the electric appliances, the secondary battery of one embodiment of the present invention can be used as a secondary battery for supplying enough power for almost the whole power consumption (referred to as a main power supply). Alternatively, in the electric appliances, the secondary battery of one embodiment of the present invention can be used as a secondary battery which can supply power to the electric appliances when the supply of power from the main power supply or a commercial power supply is stopped (such a secondary battery is referred to as an uninterruptible power supply). Still alternatively, in the electric appliances, the secondary battery of one embodiment of the present invention can be used as a secondary battery for supplying power to the electric appliances at the same time as the power supply from the main power supply or a commercial power supply (such a secondary battery is referred to as an auxiliary power supply).

Figure 9:
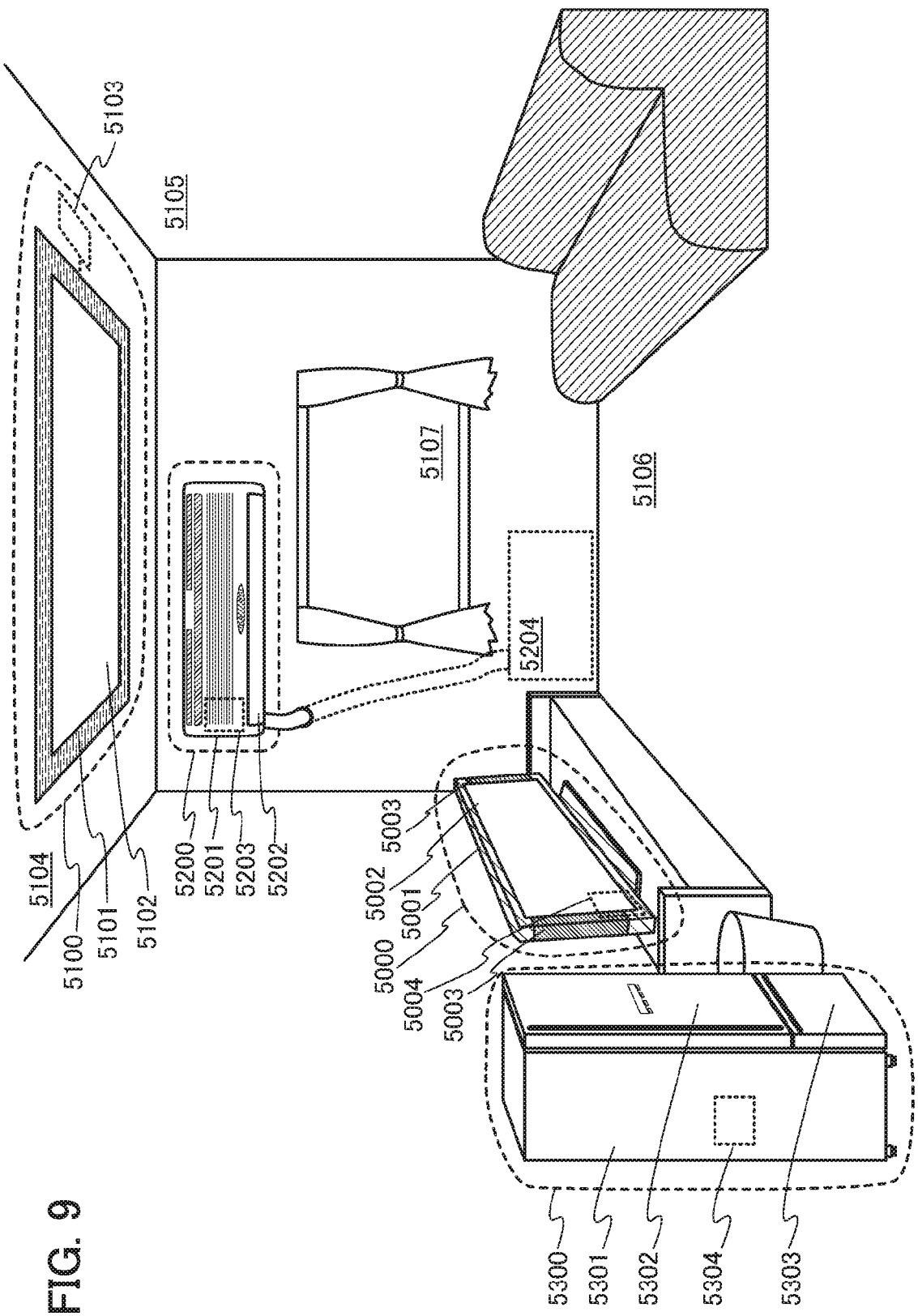
FIG. 9 illustrates examples of electric appliances.

FIG. 9 illustrates specific structures of the electric appliances. In FIG. 9, a display device 5000 is an example of an electric appliance including a secondary battery 5004 of one embodiment of the present invention. Specifically, the display device 5000 corresponds to a display device for TV broadcast reception and includes a housing 5001, a display portion 5002, speaker portions 5003, and the secondary battery 5004. The secondary battery 5004 of one embodiment of the present invention is provided in the housing 5001. The display device 5000 can receive power from a commercial power supply. Alternatively, the display device 5000 can use power stored in the secondary battery 5004. Thus, the display device 5000 can be operated with the use of the secondary battery 5004 of one embodiment of the present invention as an uninterruptible power supply even when power cannot be supplied from a commercial power supply due to power failure or the like.

A semiconductor display device such as a liquid crystal display device, a light-emitting device in which a light-emitting element such as an organic EL element is provided in each pixel, an electrophoresis display device, a digital to micromirror device (DMD), a plasma display panel (PDP), or a field emission display (FED) can be used for the display portion 5002.

Note that the display device includes, in its category, all of information display devices for personal computers, advertisement displays, and the like besides TV broadcast reception.

In FIG. 9, an installation lighting device 5100 is an example of an electric appliance including a secondary battery 5103 of one embodiment of the present invention. Specifically, the lighting device 5100 includes a housing 5101, a light source 5102, and a secondary battery 5103. Although FIG. 9 illustrates the case where the secondary battery 5103 is provided in a ceiling 5104 on which the housing 5101 and the light source 5102 are installed, the secondary battery 5103 may be provided in the housing 5101. The lighting device 5100 can receive power from a commercial power supply. Alternatively, the lighting device 5100 can use power stored in the secondary battery 5103. Thus, the lighting device 5100 can be operated with the use of the secondary battery 5103 of one embodiment of the present invention as an uninterruptible power supply even when power cannot be supplied from a commercial power supply due to power failure or the like.

Note that although the installation lighting device 5100 provided in the ceiling 5104 is illustrated in FIG. 9 as an example, the secondary battery of one embodiment of the present invention can be used in an installation lighting device provided in, for example, a wall 5105, a floor 5106, a window 5107, or the like other than the ceiling 5104. Alternatively, the secondary battery can be used in a tabletop lighting device or the like.

As the light source 5102, an artificial light source which emits light artificially by using power can be used. Specifically, discharge lamps such as an incandescent lamp and a fluorescent lamp, and light-emitting elements such as an LED and an organic EL element are given as examples of the artificial light source.

In FIG. 9, an air conditioner including an indoor unit 5200 and an outdoor unit 5204 is an example of an electric appliance including a secondary battery 5203 of one embodiment of the invention. Specifically, the indoor unit 5200 includes a housing 5201, an air outlet 5202, and a secondary battery 5203. Although FIG. 9 illustrates the case where the secondary battery 5203 is provided in the indoor unit 5200, the secondary battery 5203 may be provided in the outdoor unit 5204. Alternatively, the secondary batteries 5203 may be provided in both the indoor unit 5200 and the outdoor unit 5204. The air conditioner can receive power from a commercial power supply. Alternatively, the air conditioner can use power stored in the secondary battery 5203. Particularly in the case where the secondary batteries 5203 are provided in both the indoor unit 5200 and the outdoor unit 5204, the air conditioner can be operated with the use of the secondary battery 5203 of one embodiment of the present invention as an uninterruptible power supply even when power cannot be supplied from a commercial power supply due to power failure or the like.

Note that although the split-type air conditioner including the indoor unit and the outdoor unit is illustrated in FIG. 9 as an example, the secondary battery of one embodiment of the present invention can be used in an air conditioner in which the functions of an indoor unit and an outdoor unit are integrated in one housing.

In FIG. 9, an electric refrigerator-freezer 5300 is an example of an electric appliance including a secondary battery 5304 of one embodiment of the present invention. Specifically, the electric refrigerator-freezer 5300 includes a housing 5301, a door for a refrigerator 5302, a door for a freezer 5303, and the secondary battery 5304. The secondary battery 5304 is provided in the housing 5301 in FIG. 9. The electric refrigerator-freezer 5300 can receive power from a commercial power supply. Alternatively, the electric refrigerator-freezer 5300 can use power stored in the secondary battery 5304. Thus, the electric refrigerator-freezer 5300 can be operated with the use of the secondary battery 5304 of one embodiment of the present invention as an uninterruptible power supply even when power cannot be supplied from a commercial power supply due to power failure or the like.

Note that among the electric appliances described above, a high-frequency heating apparatus such as a microwave oven and an electric appliance such as an electric rice cooker require high power in a short time. The tripping of a breaker of a commercial power supply in use of an electric appliance can be prevented by using the secondary battery of one embodiment of the present invention as an auxiliary power supply for supplying power which cannot be supplied enough by a commercial power supply.

In addition, in a time period when electric appliances are not used, particularly when the proportion of the amount of power which is actually used to the total amount of power which can be supplied from a commercial power supply source (such a proportion referred to as a usage rate of power) is low, power can be stored in the secondary battery, whereby the usage rate of power can be reduced in a time period when the electric appliances are used. For example, in the case of the electric refrigerator-freezer 5300, power can be stored in the secondary battery 5304 in night time when the temperature is low and the door for a refrigerator 5302 and the door for a freezer 5303 are not often opened or closed. On the other hand, in daytime when the temperature is high and the door for a refrigerator 5302 and the door for a freezer 5303 are frequently opened and closed, the secondary battery 5304 is used as an auxiliary power supply; thus, the usage rate of power in daytime can be reduced.

This embodiment can be implemented in appropriate combination with any of the above embodiments.

EXAMPLE 1

Figure 3A:
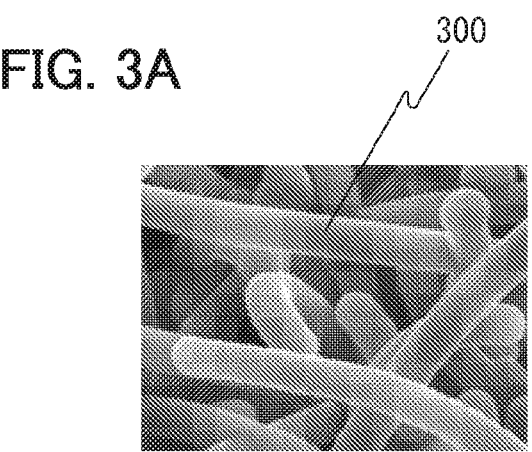
FIGS. 3A and 3B are top SEM images of silicon whiskers.

In this example, a sample (hereinafter referred to as Sample A) obtained by forming graphene on a surface of whisker-like silicon by the electrophoresis method described in Embodiment 1 will be described. A plurality of pieces of whisker-like silicon 300 described in this example are formed on a titanium sheet, and have columnar shapes extending in various directions, as illustrated in FIG. 3A. Thus, the surface of the sample on which graphene is formed has a complex three-dimensional structure attributed to many pieces of the whisker-like silicon 300.

An aqueous solution in which graphene oxide was dispersed was formed as follows. Potassium permanganate was added to a mixture of graphite (flake carbon) and concentrated sulfuric acid, followed by stirring for 2 hours. After that, pure water was added, the obtained mixture was stirred for 15 minutes while being heated, and a hydrogen peroxide solution was added thereto, so that a yellow-brown solution containing graphite oxide was obtained. The obtained solution was filtered, and hydrochloric acid was added to a precipitate to wash the precipitate, followed by washing with pure water. Then, ultrasonic treatment was performed for 2 hours so that the graphite oxide was separated into graphene oxide, and an aqueous solution in which graphene oxide was dispersed was obtained.

The titanium sheet with the whisker-like silicon was immersed in the aqueous solution as an electrode, and a stainless steel plate was immersed therein as another electrode. Here, the distance between the titanium sheet and the stainless steel plate was 1 cm. Then, with the titanium sheet and the stainless steel plate used as an anode and a cathode respectively, a voltage of 10 V was applied between the anode and the cathode for 30 seconds. The amount of charge flowing during the 30 seconds was 0.089 C. FIG. 2 is a schematic view of the apparatus.

Figure 3B:
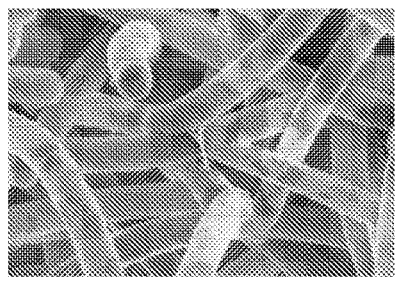

After that, the titanium sheet was taken out of the aqueous solution, dried, and then heated at 300° C. in a vacuum (0.1 Pa or less) for 10 hours. In such a manner, Sample A was formed. FIG. 3B shows an observed surface of the obtained whisker-like silicon. Apparently, there seems to be no differences between the state before formation of graphene in FIG. 3A and the state in FIG. 3B; however. FIG. 3B shows that surfaces of whiskers have black portions in patches like a mottled pattern. These black potions are probably thick because the number of graphene sheets stacked in multilayer graphene is large. Note that this difference in number of stacked graphene sheets does not influence practical evenness. Further, it is observed in a center portion of the photograph that a thread-like or film-like object is formed, so as to link whiskers.

Figure 10A:
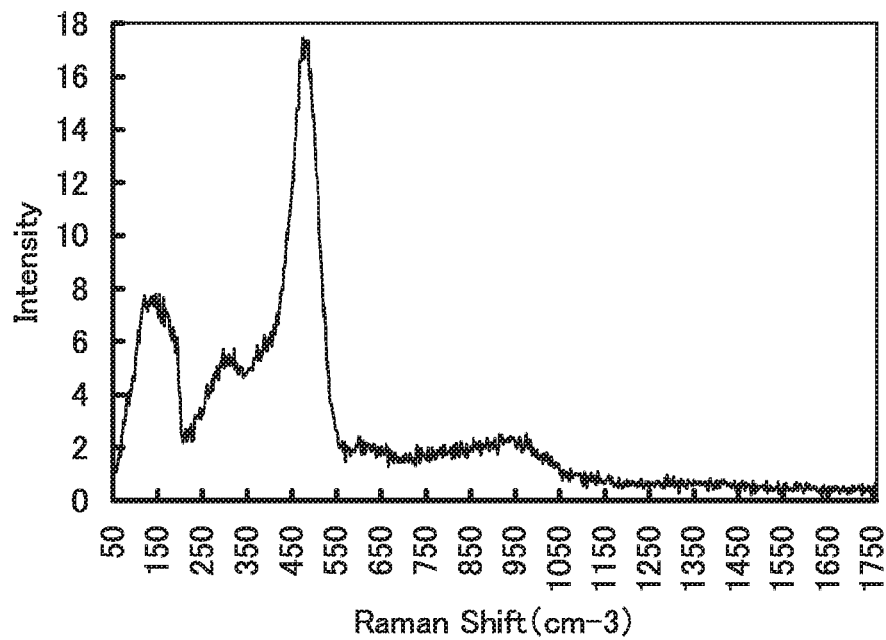
FIGS. 10A and 10B are profiles each showing Raman spectroscopy measurement results of silicon whiskers.
Figure 10B:
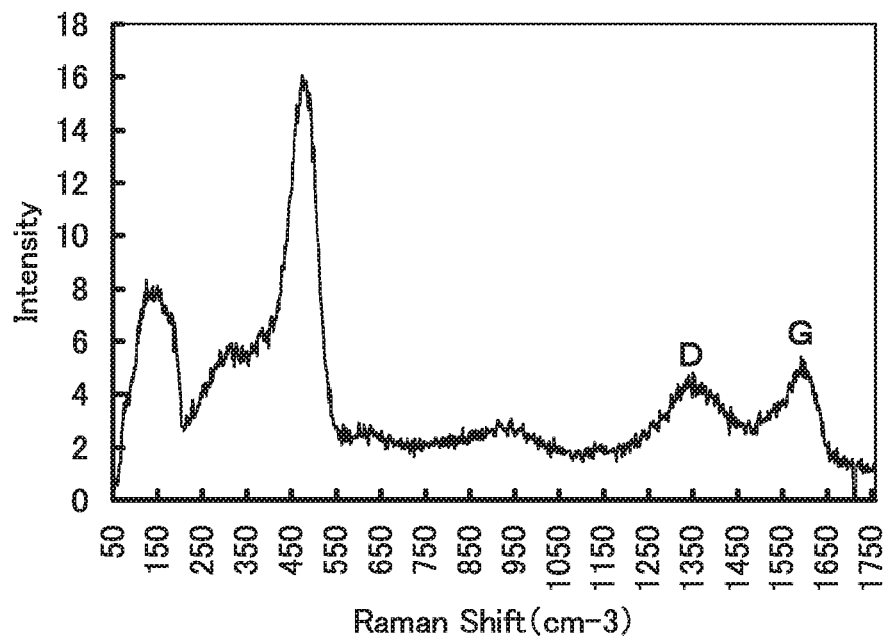

Peaks of a D band and a G band, which are characteristics of graphene, were seen in any portion of the whiskers in measurement by Raman spectroscopy. The results suggest that substantially the entire surfaces of the whiskers were coated with graphene. FIG. 10A shows results obtained by carrying out measurement on whisker-like silicon not coated with graphene by Raman spectroscopy. In contrast, FIG. 10B shows results obtained by carrying out measurement on whisker-like silicon coated with graphene by Raman spectroscopy. In FIG. 10B, peaks which are not seen in FIG. 10A are seen at around 1340 $cm^{-3}$ and 1580 $cm^{-3}$. The peak at around 1340 $cm^{-3}$ is derived from the D band and indicates that graphene includes defects or impurities. The peak at around 1580 $cm^{-3}$ is derived from the G band.

Figure 7A:
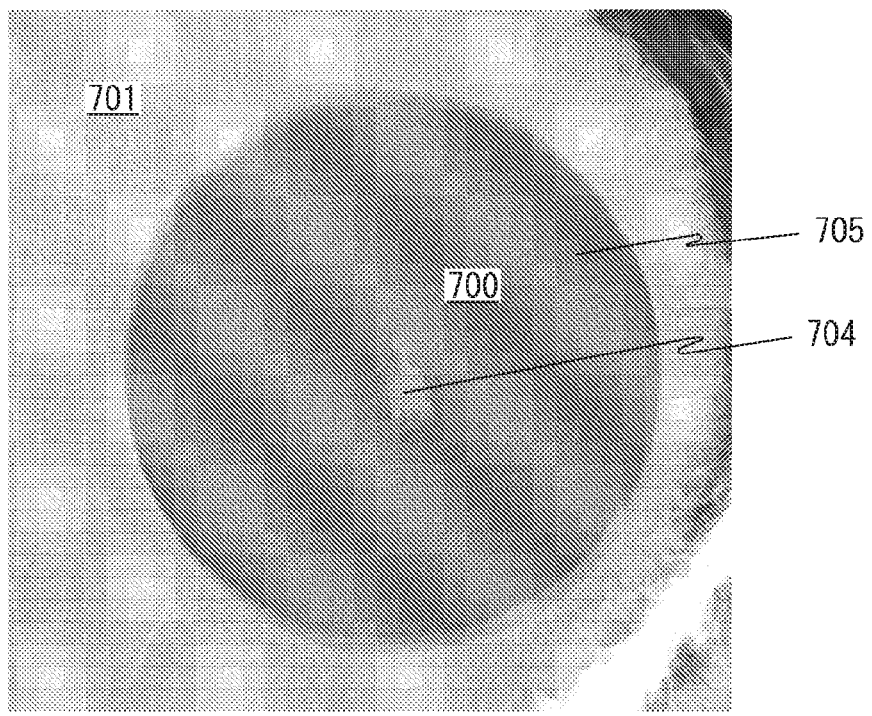
FIGS. 7A and 7B are cross-sectional TEM images of silicon whiskers and graphene coating the silicon whiskers.
Figure 7B:
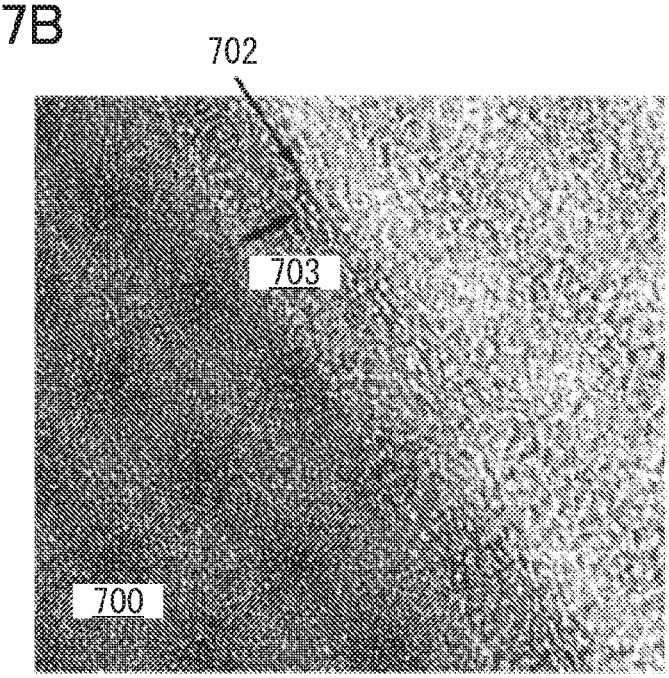

FIGS. 7A and 7B are photographs showing a cross section of a whisker coated with graphene. FIG. 7A shows a transverse cross section of the cylindrical whisker observed with a transmission electron microscope (TEM). A circle-like portion is a whisker 700 formed of silicon, and extremely thin graphene is formed around the whisker 700. Further, for the sake of observation, a deposited carbon film 701 is provided thick on an outermost surface. FIG. 7B is a magnified photograph of part of FIG. 7A. In FIG. 7B, part of the whisker 700 is shown on the left side, and extremely thin graphene 702 is formed on an end portion of the whisker 700. The thickness of the graphene 702 is approximately 1 nm to 2 nm, which is equivalent to 2 sheets to 3 sheets of single-layer graphene. Note that in the sample observed, a natural oxide film 703 is formed between the whisker-like silicon and the graphene. FIG. 7B indicates that even when the natural oxide film 703, which is nonconductive, is provided on silicon, graphene can be formed sufficiently by an electrophoresis method.

In the whisker shown in FIG. 7A, a center portion 704, the core in the transverse cross section, is formed of crystalline silicon (crystal silicon). On the other hand, an outer shell portion 705 coating the periphery of the center portion 704 thick is formed of amorphous silicon. The contrast in the TEM image allows discrimination between the crystalline silicon and the amorphous silicon. In the case where the structure of this example is applied to an electrode of a secondary battery, the volume is unlikely to be changed due to occlusion and release of ions of lithium or the like serving as carriers and thus the electrode is not easily destroyed as compared to the case Where a whisker which is wholly crystalline is used. Particularly because amorphous silicon occludes carriers more easily than crystalline silicon, forming the outer shell portion 705 thick leads to an increase in capacity of a secondary battery.

In a comparative example (Sample B), graphene was formed on a surface of whisker-like silicon by a coating method. In the case of Sample B, a titanium sheet with the whisker-like silicon was immersed in an aqueous solution where graphene oxide was dispersed which is similar to the aqueous solution used for forming Sample A, and then the titanium sheet was taken out of the aqueous solution. After that, Sample B was dried and heated under the conditions the same as those of Sample A. Through this heating step, graphene oxide was reduced to graphene.

Figure 4A:
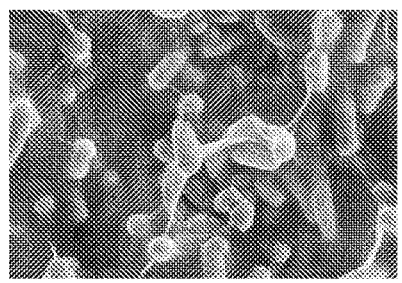
FIG. 4A is a top SEM image of silicon whiskers and FIG. 4B is a cross-sectional SEM image of a silicon whisker.

FIG. 4A shows the state of a surface of Sample B. It can be observed in FIG. 4A that film-like graphene is formed, so as to link projections of whisker-like silicon. However, the state of whisker-like silicon under the film-like graphene cannot be seen due to the film-like graphene. The film-like graphene is only partly formed on part of the whisker-like silicon, which suggests that the thickness of graphene varies significantly in one sample.

Figure 4B:
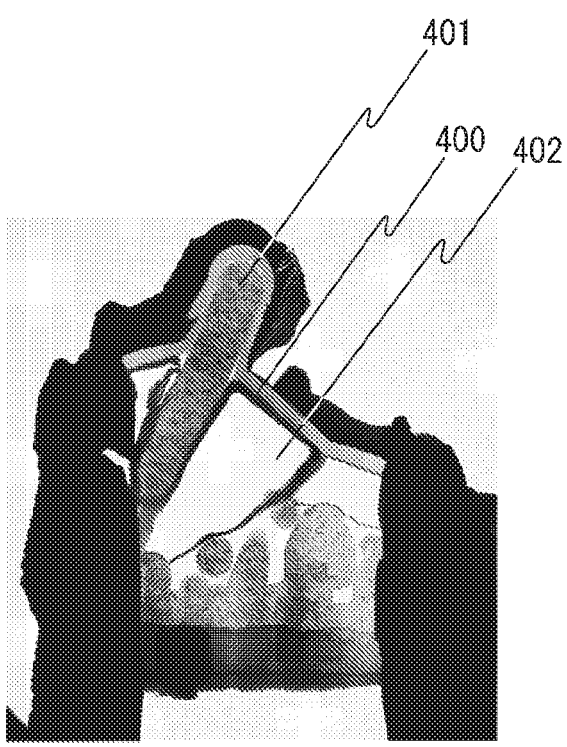

When a cross section is observed to check the state of a depression in FIG. 4A, it is observed in FIG. 4B that there is a gap 402 between a film-like layer 400 containing graphene and a concave surface. Further, according to FIG. 4B, graphene is not formed on part of a surface of a whisker-like silicon 401 which is in contact with this gap. Note that for observation of the sample, a deposited carbon film was formed on the graphene; thus, it is necessary to keep in mind that the deposited carbon film is provided on graphene in FIG. 4B.

As described above, it was difficult to form graphene so as to sufficiently coat a surface of an object having a complex shape or structure by a coating method. Further, the thicknesses of graphene significantly varied between the samples and in the same sample; thus, it was also difficult to control the thickness of graphene.

In contrast, when an electropheresis method was employed, a portion where graphene oxide is deposited is unlikely to be coated with another graphene oxide, so that an even film of graphene oxide was able to be formed with significantly high reproducibility. This result reveals that the electrophoresis method described in Embodiment 1 enables formation of graphene with extremely high evenness and reliability as compared to a coating method.

EXAMPLE 2

In this example, comparison is made between the case where whisker-like silicon whose surface was provided with graphene was used for a negative electrode of a lithium-ion secondary battery and the case where whisker-like silicon whose surface was not provided with anything was used for a negative electrode of a lithium-ion secondary battery. It is known that an electrolyte solution used in the lithium-ion secondary battery reacts with an electrode (in particular, a negative electrode), so that a compound film obtained by decomposing the electrolyte solution is formed on a surface of the electrode.

Such a compound film is referred to as a solid electrolyte interface (SEI) and is considered necessary for stabilization with a suppressed reaction between an electrode and an electrolyte. However, the thickness depends on a combination of the electrode and the electrolyte and thus may become larger than necessary.

Examples of adverse effects due to SEI formation include a decrease in coulombic efficiency, a decrease in lithium ion conductivity between an electrode and an electrolyte, and loss of the electrolyte. An attempt to coat a surface of an electrode by a vapor deposition method or a CVD method has been conventionally made in order to suppress such SEI formation.

The surface area of an electrode of a lithium-ion secondary battery is preferably large; therefore, for example, an object having a complex shape such as whisker-like silicon is preferably used. However, a surface of such an object having a complex shape cannot be coated sufficiently by a conventional vapor deposition method or CVD method. In contrast, the method described in Embodiment 1 and Example 1 allows proper coating of even a surface of such an object having a complex shape of a plurality of pieces of whisker-like silicon. Accordingly, it is possible to suppress excessive SEI formation and to increase the surface area of an electrode.

In this example, two kinds of samples, Sample C and Sample D, were prepared. Sample C is an object having a plurality of pieces of whisker-like silicon whose surfaces were not provided with anything and had an initial state similar to the state in FIG. 3A. Sample D is an object having a plurality of pieces of whisker-like silicon whose surfaces were provided with graphene by the method described in Example 1 and had an initial state similar to the state in FIG. 3B.

Then, cyclic voltammetry measurement (CV measurement) was performed on each of Sample C and Sample D. Ten cycles of the CV measurement were performed at a scan rate of 0.1 mV/sec within a scan range of 0 V to 1 V (vs. Li/Li$^+$) using a three-electrode cell (silicon including whiskers was used for a working electrode; metallic lithium was used for each of a reference electrode and a counter electrode; an electrolyte solution was a mixed solution of an ethylene carbonate (EC) solution and diethyl carbonate (DEC) (1:1 in volume ratio) in which 1 mol/L of lithium hexafluorophosphate (LiPF$_6$) was dissolved). Note that in the first cycle, scanning was started from an open-circuit potential.

Figure 5:
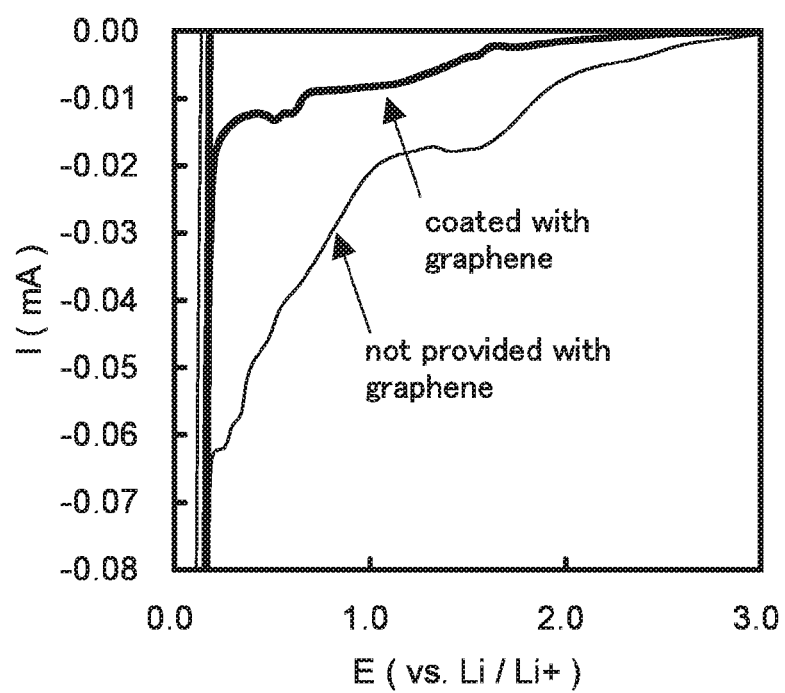
FIG. 5 shows results of CV measurement.

FIG. 5 is a graph focusing on reduction current at high potential in the first cycle in CV measurement results. A significant increase in reduction current from around 0.20 V (vs. Li/Li$^+$) indicates that silicon and lithium reacted with each other to form an alloy. It is known that reduction current at a potential higher than 0.20 V (vs. Li/Li$^+$) is derived from a decomposition reaction unnecessary for a battery and this decomposition reaction causes formation of a surface coating film on a surface of an electrode. Such a surface coating film is preferably thin. As shown in FIG. 5, the sample coated with graphene has a smaller reduction current at a higher potential than the sample not provided with anything. This result suggests that graphene helps suppress formation of a coating film on a surface of an electrode (here, a surface of the whisker-like silicon).

Coin cells were fabricated using Sample C and Sample D for positive electrodes; metallic lithium for negative electrodes; a mixed solution of an ethylene carbonate (EC) solution and diethyl carbonate (DEC) (1:1 in volume ratio) in which 1 mol/L of lithium hexafluorophosphate (LiPF$_6$) is dissolved, as each electrolyte solution; and polypropylene with minute holes as each separator. Then, the coin cells were charged and discharged to measure the amount of change in capacity associated with release and absorption of lithium. The amount of current in the charging and discharging was set to 50 µA for the first cycle and 4 mA for the second cycle and the subsequent cycles. The potential range was 0.03 V to 1.0 V (vs. Li/Li$^+$).

Figure 6A:
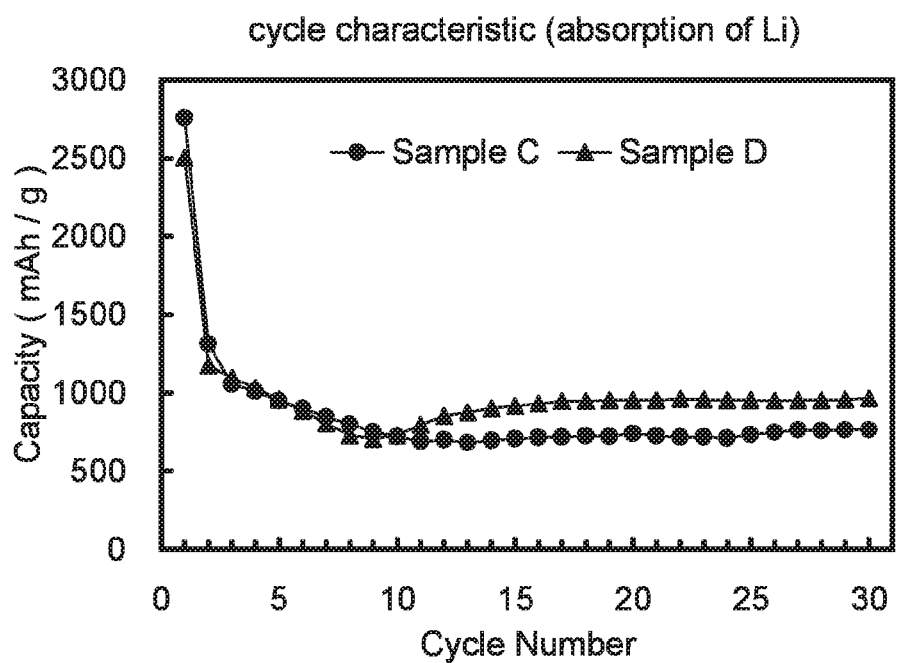
FIGS. 6A and 6B show cycle characteristics of batteries.
Figure 6B:
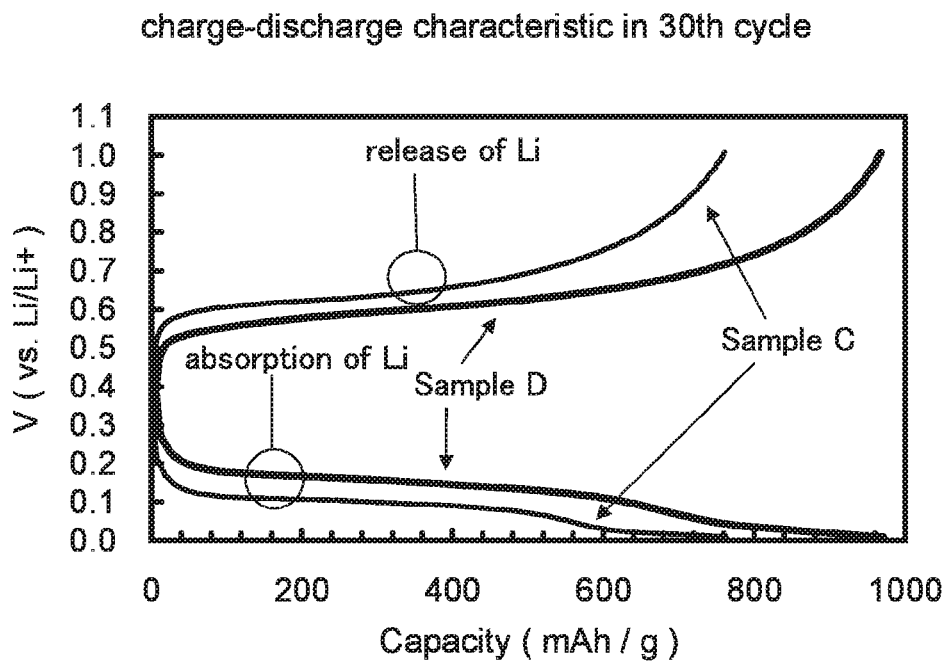

As shown in FIG. 6A, when release and absorption of lithium were repeated, the capacity of each of Sample C and Sample D was reduced; however, the capacity of Sample D was increased to be higher than that of Sample C in the tenth cycle and the subsequent cycles. FIG. 6B shows the relation between the capacity and a change in the potential which are associated with the release (or absorption) of lithium in the thirtieth cycle. Sample D has a higher capacity than Sample C, which indicates that Sample D can release and absorb a larger amount of lithium than Sample C. This is probably because the SEI formed on Sample D was not as thick as the SEI formed on Sample C.

EXAMPLE 3

In this example, description will be given of the case where silicon whiskers are used as projections and a film-like carbon-based material is formed by an electrophoresis method.

Figure 20:
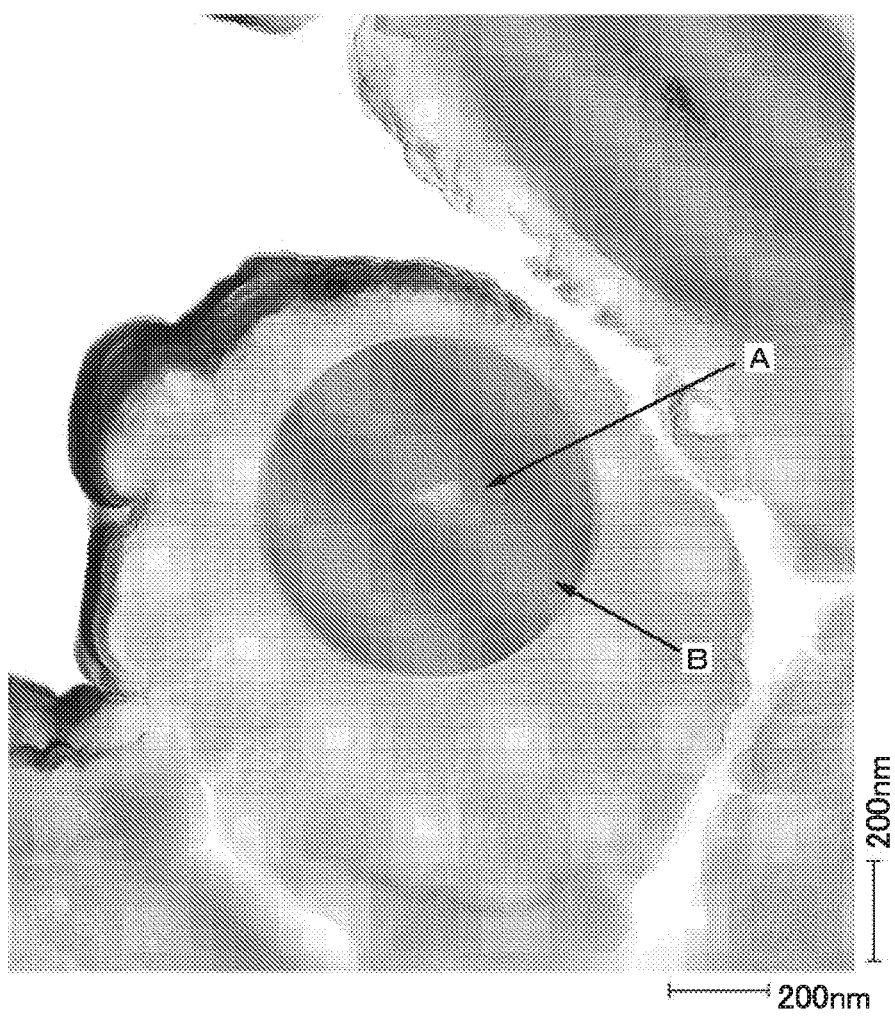
FIG. 20 shows a silicon whisker of one embodiment of the present invention.

As a current collector, a titanium sheet with a purity of 99.5% and a thickness of 100 µm was prepared. Silicon whiskers were formed over the current collector. The silicon whickers were formed by a low pressure CVD (LPCVD) method in a reaction chamber into which 300 sccm of silane gas (SiH$_4$ gas) and 300 sccm of nitrogen gas (N$_2$ gas) were introduced as source gases and in which the pressure was 150 Pa and the temperature was 550° C. When the temperature of the current collector was increased, argon was introduced into the reaction chamber. The diameter of the silicon Whisker was 700 nm. As shown in FIG. 20, a center portion A of the silicon whisker is crystalline and a peripheral portion B, which is other than the center portion, is amorphous. The titanium sheet over which the silicon whiskers were formed was cleaned with 0.5% of hydrofluoric acid for ten minutes.

Figure 14:
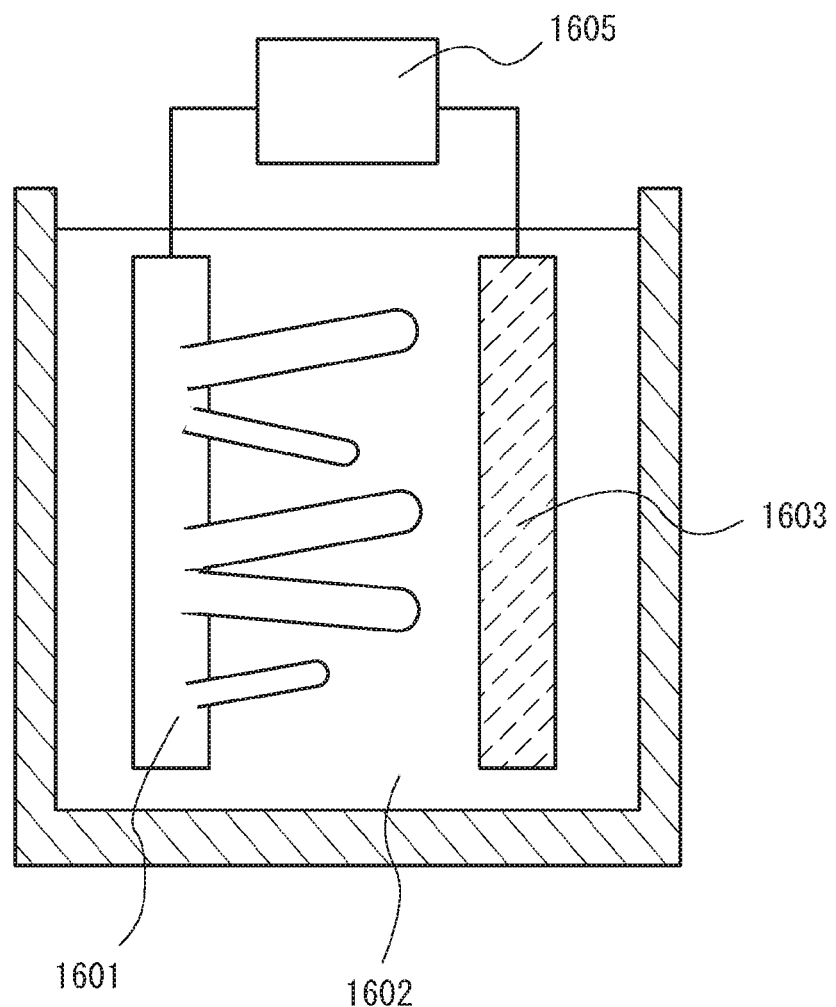
FIG. 14 illustrates a forming apparatus used in one embodiment.

As illustrated in FIG. 14, a titanium sheet 1601 provided with silicon whiskers were immersed in art aqueous solution 1602 in which graphene oxide was dispersed. The aqueous solution was formed as follows. Potassium permanganate was added to a mixture of graphite (flake carbon) and concentrated sulfuric acid, followed by stirring for 2 hours. After that, pure water was added to the mixture, the mixture was stirred for 15 minutes while being heated, and a hydrogen peroxide solution was added thereto, so that a yellow-brown solution containing graphite oxide was obtained. Furthermore, the obtained solution was filtered, and hydrochloric acid was added, followed by washing with pure water. After that, ultrasonic treatment was performed for 2 hours so that the graphite oxide was separated into graphene oxide, and an aqueous solution in which graphene oxide was dispersed was obtained.

The titanium sheet 1601 with the whisker-like silicon was immersed in the aqueous solution as an electrode, and a stainless steel plate 1603 was immersed therein as another electrode. Here, the distance between the titanium sheet and the stainless steel plate was 1 cm. Then, with the titanium sheet and the stainless steel plate used as an anode and a cathode respectively, a voltage of 10 V was applied using a power source 1605 for 15 minutes. The amount of charge flowing during the 15 minutes was 0.223 C.

Figure 15A:
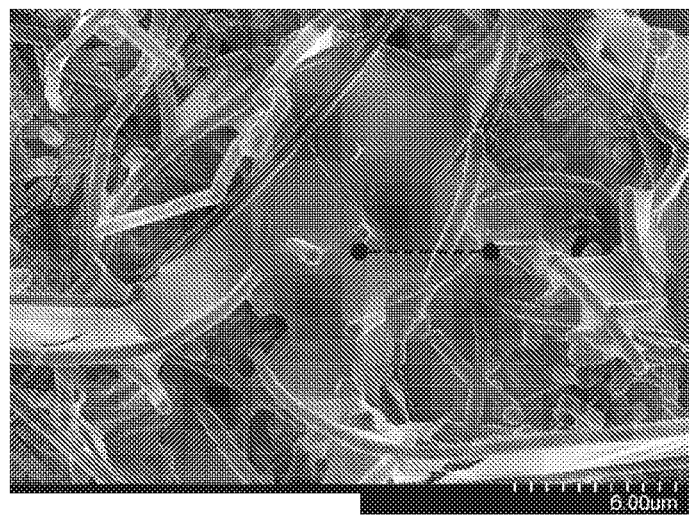
FIGS. 15A and 15B show a film-like carbon-based material of one embodiment of the present invention.
Figure 15B:
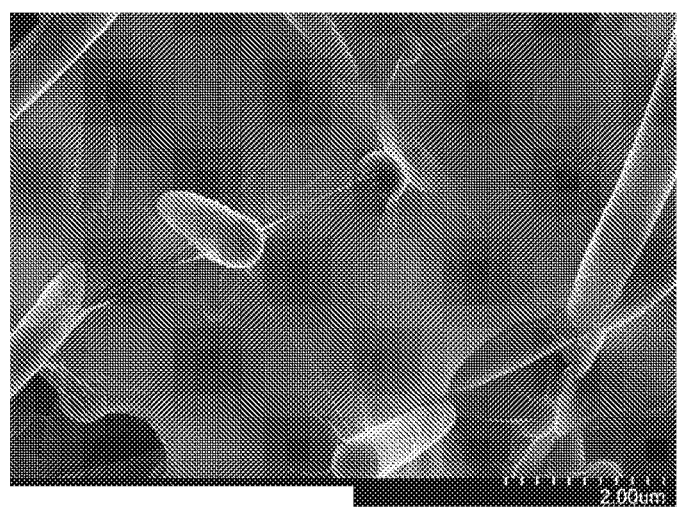

After that, the titanium sheet was taken out of the aqueous solution, dried, and then heated at 300° C. in a vacuum (0.1 Pa or less) for 10 hours. In such a manner, Sample E was formed. FIGS. 15A and 15B are TEM images showing an observed surface of Sample E obtained. It is observed in a center portion of FIG. 15A that a film-like carbon-based material is provided, so as to link whiskers. FIG. 15B is a magnified photograph of part of FIG. 15A. These show that the film-like carbon-based material is provided from a rounded top portion of the silicon whisker, which is a projection, to the nearby silicon whisker. Observed from the top portion of the silicon whisker, the carbon-based material is provided like a tent.

In the electrophoresis method, the state of the film-like carbon-based material can be controlled with the amount of charge; thus, the electrophoresis method has high reproducibility. Further, the film-like carbon-based material can be formed over a large area. Furthermore, the thickness of the film-like carbon-based material is easily controlled.

Figure 16:
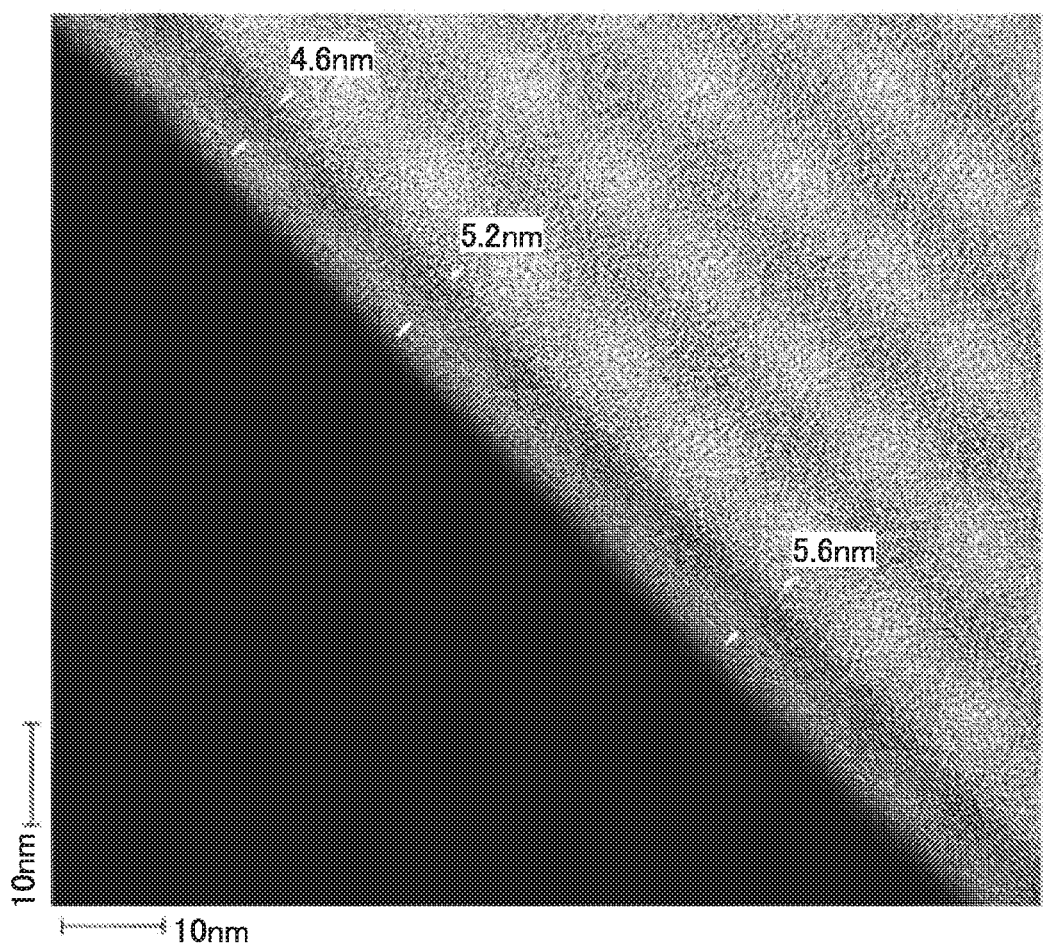
FIG. 16 shows a film-like carbon-based material of one embodiment of the present invention.

FIG. 16 is a TEM image showing a cross section along a dotted line in FIG. 15A. The thickness of the film-like carbon-based material is 4.6 nm to 5.6 nm inclusive. The film-like carbon-based material includes 8 to 10 sheets stacked.

EXAMPLE 4

Figure 17:
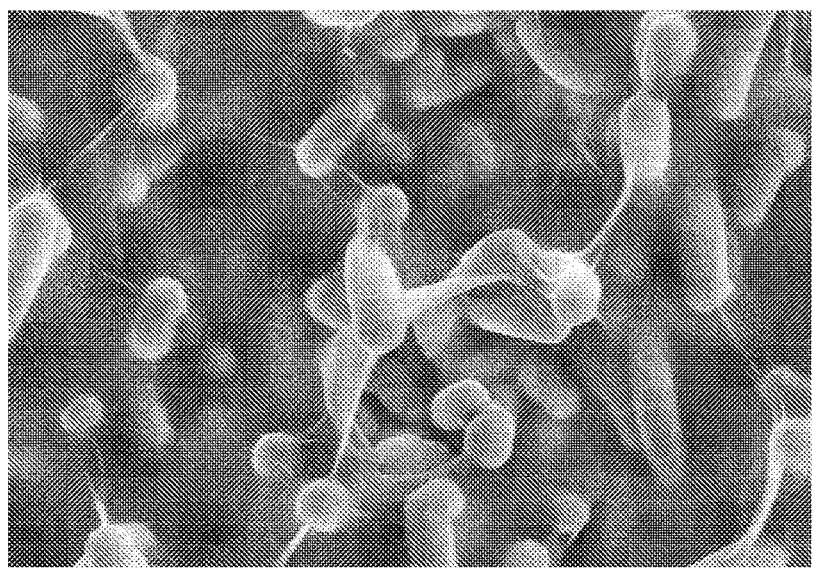
FIG. 17 shows a film-like carbon-based material of one embodiment of the present invention.

FIG. 17 is a TEM image showing Sample F obtained by an electrophoresis method in which a voltage of 10 V was applied for 5 minutes. A film-like carbon-based material is observed in part of the image. The amount of charge flowing during the 5 minutes was 0.113 C.

EXAMPLE 5

A cycle test was performed on Sample E formed as in Example 3. The conditions of the cycle test were as follows. A coin cell was fabricated using Sample E for a positive electrode; metallic lithium for a negative electrode; a mixed solution of an ethylene carbonate (EC) solution and diethyl carbonate (DEC) (1:1 in volume ratio) in which 1 mol/L of lithium hexafluorophosphate ($LiPF_6$) is dissolved, as an electrolyte solution; and polypropylene with minute holes as a separator. Then, the coin cell was charged and discharged to measure the amount of change in capacity associated with release and absorption of lithium. The charging/discharging rate was set to 0.2 C for the first cycle and 0.5 C for the second cycle and the subsequent cycles. The potential range was 0.03 V to 1.0 V (vs. $Li/Li^+$).

Figure 18:
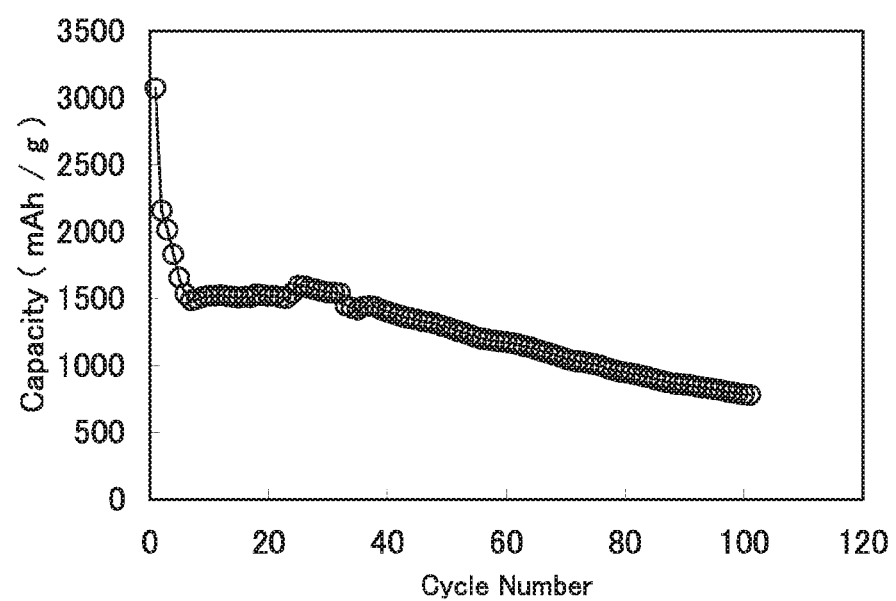
FIG. 18 shows cycle characteristics of a battery containing a film-like carbon-based material of one embodiment of the present invention.

FIG. 18 shows cycle characteristics. Specifically. FIG. 18 shows changes in capacity in occlusion of lithium, with the X axis indicating the cycle number (times) and the Y axis indicating capacity (mAh/g). The result reveals that occlusion and release of lithium are possible.

REFERENCE EXAMPLE

A sample formed by reducing graphene oxide by heat treatment was used for a positive electrode and metallic lithium was used for a negative electrode, and a cycle test was performed. A graphene oxide aqueous solution was dried and heated at 300° C. in a vacuum (0.1 Pa or less) for 10 hours, so that the positive electrode was formed.

The amount of current in the charging and discharging was set to 1 μA, and the potential range was 0 V to 1 V (vs. $Li/Li^+$). The other conditions are similar to those in Example 4.

Figure 19:
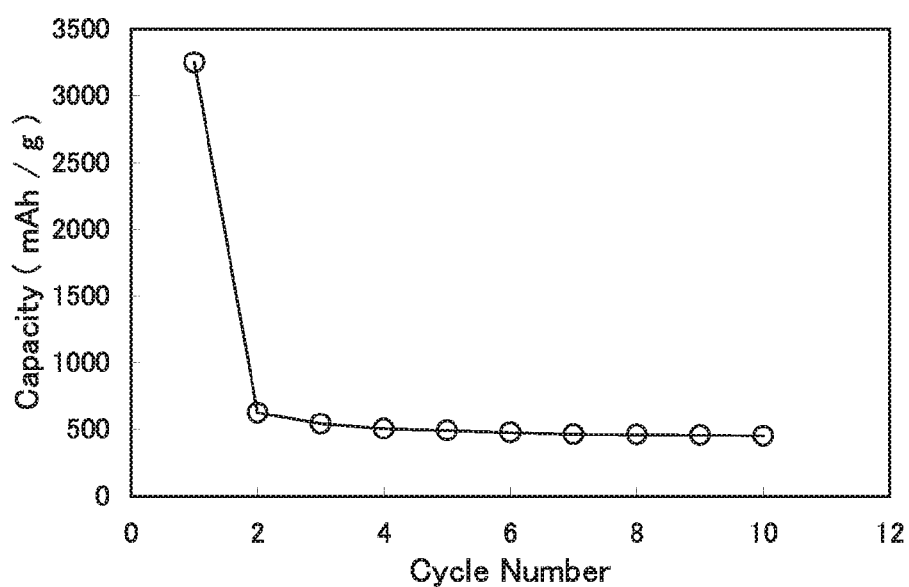
FIG. 19 shows cycle characteristics of a battery containing an aqueous solution in which graphene oxide is dispersed.

FIG. 19 shows cycle characteristics. In FIG. 19, the X axis and the Y axis indicate the cycle number (times) and capacity (mAh/g), respectively.

The result in FIG. 19 reveals that a film-like carbon-based material containing graphene oxide obtained by reduction by heat treatment also has a function of an active material.

EXPLANATION OF REFERENCE

100: solution, 101: object, 102: graphene oxide, 103: graphene oxide, 200: container, 201: solution, 202: object, 203: conductor, 300: whisker-like silicon, 400: film-like layer containing graphene, 401: whisker-like silicon, 402: gap, 700: whisker, 701: deposited carbon film, 702: graphene, 703: natural oxide film, 704: center portion, 705: outer shell portion, 800: negative electrode current collector, 802: negative electrode active material layer, 804: negative electrode, 806: housing, 810: separator, 820: ring-shaped insulator, 828: positive electrode current collector, 830: positive electrode active material layer, 832: positive electrode, 840: spacer, 842: washer, 844: housing, 1100: current collector, 1101: projection, 1101a: projection, 1101b: projection, 1101c: projection, 1101d: projection, 1101e: projection, 1102: film-like carbon-based material, 1103: carbon-based material, 1104: graphene, 1301: secondary battery, 1303: exterior member, 1305: power storage cell, 1313: negative electrode, 1315: positive electrode, 1317: separator, 1319: electrolyte solution, 1321: negative electrode current collector, 1323: negative electrode active material layer, 1325: positive electrode current collector, 1327: positive electrode active material layer, 5000: display device, 5001: housing, 5002: display portion, 5003: speaker portion, 5004: secondary battery, 5100: lighting device, 5101: housing, 5102: light source, 5103: secondary battery. 5104: ceiling, 5105: wall, 5106: floor, 5107: window, 5200: indoor unit, 5201: housing, 5202: air outlet, 5203: secondary battery, 5300: electric refrigerator-freezer, 5301: housing, 5302: refrigerator door, 5303: freezer door, and 53011: secondary battery This application is based on Japanese Patent Application serial no. 2011-179916 filed with the Japan Patent Office on Aug. 19, 2011 and Japanese Patent Application serial no. 2011-179957 filed with the Japan Patent Office on Aug. 19, 2011, the entire contents of which are hereby incorporated by reference.

The invention claimed is:

1. A negative electrode of a secondary battery, comprising:
    a projection comprising, in a cross section, a core portion including crystalline silicon and an outer shell portion around the core portion, the outer shell portion comprising amorphous silicon, and
    a carbon-based film formed on the outer shell portion of the projection,
    wherein the carbon-based film includes graphene.

2. A secondary battery comprising:
    the negative electrode according to claim 1.

3. A negative electrode of a secondary battery, comprising:
    a current collector;
    a negative electrode active material over the current collector, the negative electrode active material comprising a projection comprising, in a cross section, a core portion including crystalline silicon and an outer shell portion around the core portion, the outer shell portion comprising amorphous silicon; and
    a carbon-based film formed on the outer shell portion of the projection,
    wherein the carbon-based film includes graphene.

4. A secondary battery comprising:
    the negative electrode according to claim 3.

5. The negative electrode of a secondary battery according to claim 1, wherein the carbon-based film includes 100 sheets or more and 300 sheets or less of graphene.

6. The negative electrode of a secondary battery according to claim 1, wherein the carbon-based film is amorphous.

7. The negative electrode of a secondary battery according to claim 1, wherein the carbon-based film is crystalline.

8. The negative electrode of a secondary battery according to claim 1, wherein the projection has a columnar shape.

9. The negative electrode of a secondary battery according to claim 1, wherein the outer shell portion is thicker than the core portion.

10. The negative electrode of a secondary battery according to claim 3, wherein the carbon-based film includes 100 sheets or more and 300 sheets or less of graphene.

11. The negative electrode of a secondary battery according to claim 3, wherein the carbon-based film is amorphous.

12. The negative electrode of a secondary battery according to claim 3, wherein the carbon-based film is crystalline.

13. The negative electrode of a secondary battery according to claim 3, wherein the projection has a columnar shape.

14. The negative electrode of a secondary battery according to claim 3, wherein the outer shell portion is thicker than the core portion.

15. A negative electrode of a secondary battery, comprising:

a projection comprising, in a cross section, a core portion including crystalline silicon and an outer shell portion around the core portion, the outer shell portion comprising amorphous silicon;

a carbon-based film formed on the outer shell portion of the projection; and a natural oxide between the outer shell portion and the carbon-based film, wherein the carbon-based film includes graphene.

16. A secondary battery comprising:

the negative electrode according to claim 15.

17. The negative electrode of a secondary battery according to claim 15, wherein the projection has a columnar shape.

18. The negative electrode of a secondary battery according to claim 15, wherein the outer shell portion is thicker than the core portion.

19. The negative electrode of a secondary battery according to claim 15, wherein the carbon-based film includes 100 sheets or more and 300 sheets or less of graphene.

* * * * *